(12) United States Patent
Kurata et al.

(10) Patent No.: US 7,747,687 B2
(45) Date of Patent: Jun. 29, 2010

(54) INFORMATION PROCESSING DEVICE AND METHOD, AND PROGRAM

(75) Inventors: Masatomo Kurata, Tokyo (JP); Makoto Murata, Tokyo (JP); Brian Clarkson, Tokyo (JP); Yoshihiro Yamaguchi, Tokyo (JP); Junko Fukuda, Saitama (JP)

(73) Assignee: Sony Corporation, Tokyo (JP)

( * ) Notice: Subject to any disclaimer, the term of this patent is extended or adjusted under 35 U.S.C. 154(b) by 907 days.

(21) Appl. No.: 11/448,000

(22) Filed: Jun. 7, 2006

(65) Prior Publication Data

US 2007/0112922 A1    May 17, 2007

(30) Foreign Application Priority Data

Jun. 9, 2005    (JP) ............................. 2005-169505

(51) Int. Cl.
 *G06F 15/16* (2006.01)
(52) U.S. Cl. ........................ 709/204; 709/223; 709/246; 715/763; 455/408
(58) Field of Classification Search ................. 455/418; 709/204, 223, 246; 715/763
See application file for complete search history.

(56) References Cited

U.S. PATENT DOCUMENTS

| | | | |
|---|---|---|---|
| 7,065,566 B2 * | 6/2006 | Menard et al. ............... 709/223 |
| 2001/0031633 A1 | 10/2001 | Tuomela et al. | |
| 2002/0069249 A1 | 6/2002 | Pedersen | |
| 2002/0090926 A1 | 7/2002 | Pirkola et al. | |
| 2002/0198003 A1 | 12/2002 | Klapman | |
| 2003/0115121 A1 * | 6/2003 | Bremner et al. ............... 705/35 |
| 2004/0015610 A1 * | 1/2004 | Treadwell ................... 709/246 |
| 2004/0122924 A1 * | 6/2004 | Coryell et al. .............. 709/223 |
| 2005/0060657 A1 * | 3/2005 | DeLuca et al. .............. 715/763 |

FOREIGN PATENT DOCUMENTS

| | | |
|---|---|---|
| EP | 1 217 859 A1 | 6/2002 |
| EP | 1 397 012 A2 | 3/2004 |
| EP | 1 587 286 A2 | 10/2005 |
| JP | 2002-109689 | 4/2002 |
| JP | 2004-159267 | 6/2004 |

* cited by examiner

*Primary Examiner*—Tammy T Nguyen
(74) *Attorney, Agent, or Firm*—Oblon, Spivak, McClelland, Maier & Neustadt, L.L.P.

(57) ABSTRACT

An information processing device connected via a network to another information processing device that recognizes action of a user on a basis of an output of a sensor incorporated in the other information processing device and transmits action information indicating the recognized action of the user includes: a table DB configured to manage correspondence relation between each action recognizable in the other information processing device and communication tools; and a communication means selection processing unit configured to select a communication tool corresponding to the action of the user of the other information processing device, the action of the user being indicated by the action information, as a tool used for communication with the user of the other information processing device on a basis of the correspondence relation managed by the table DB, and execute an application that manages the selected communication tool.

6 Claims, 17 Drawing Sheets

WALK

RUN

STANDING STILL

RIDING A VEHICLE

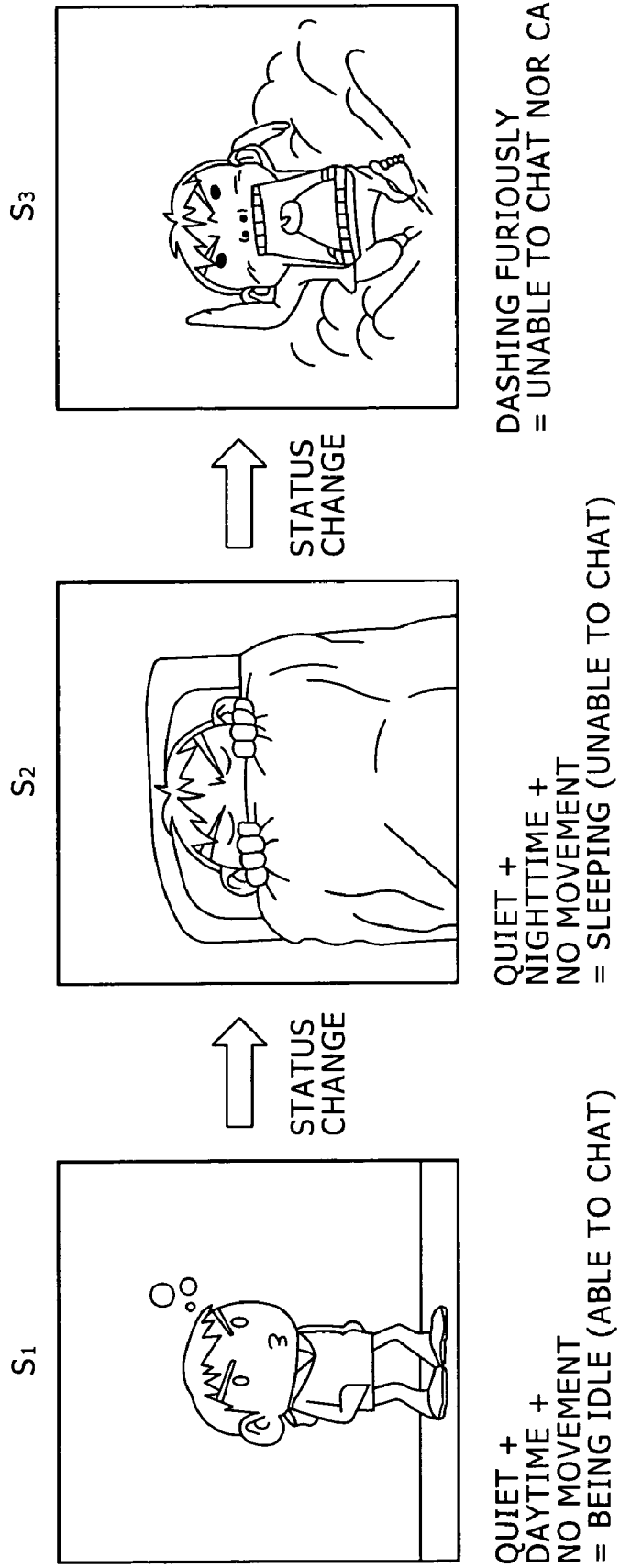

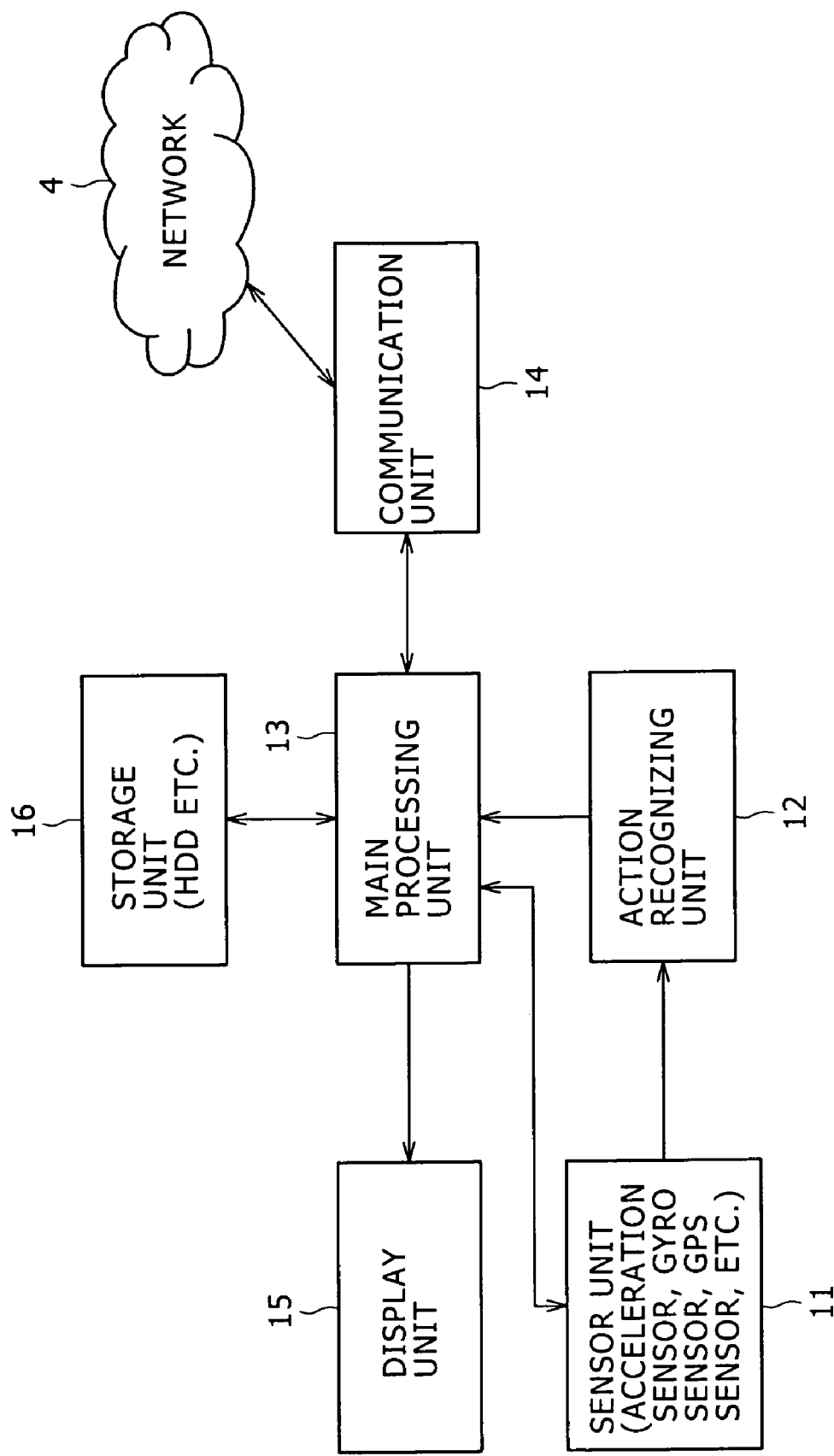

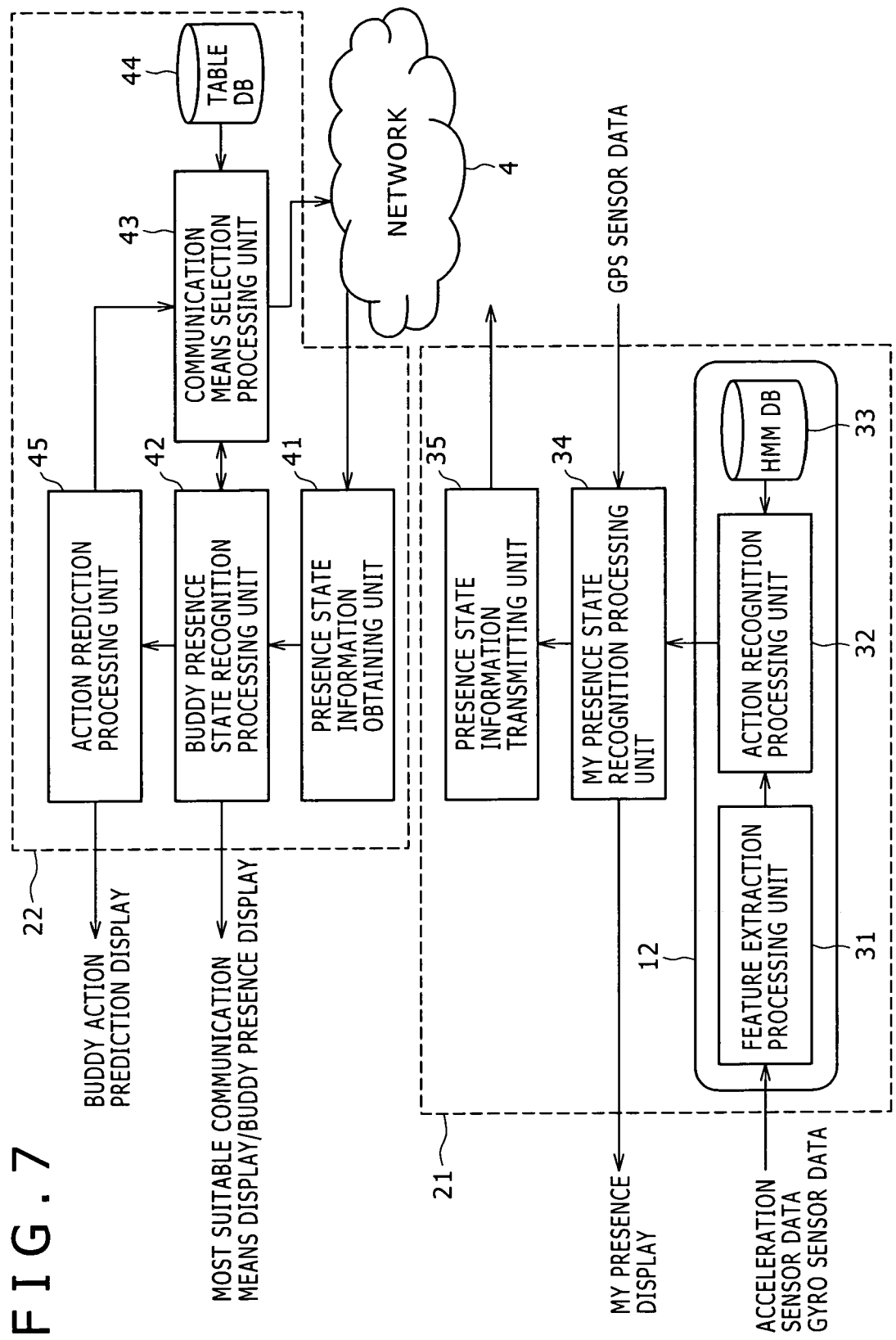

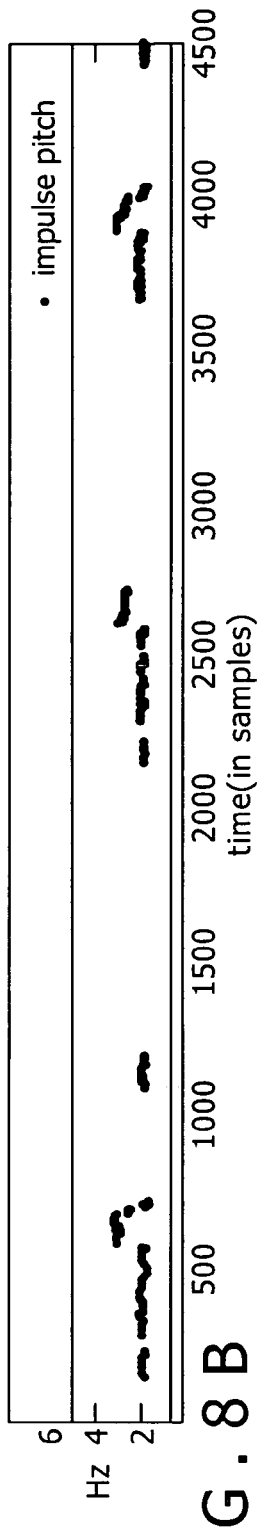
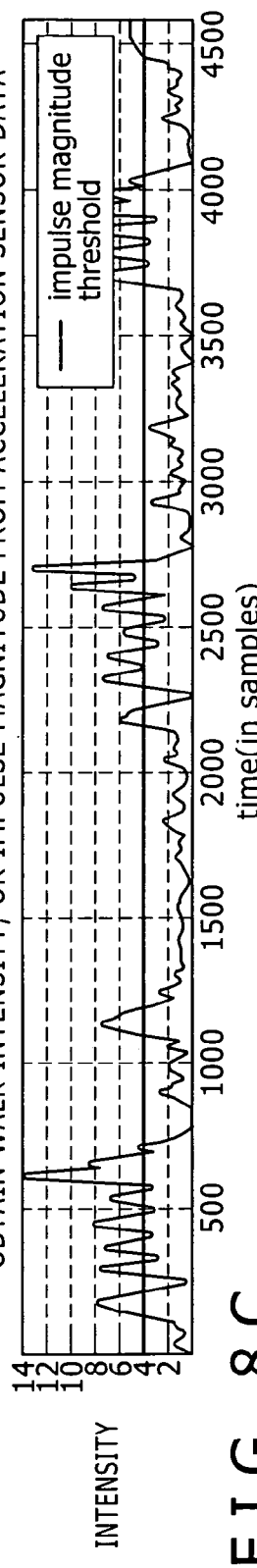
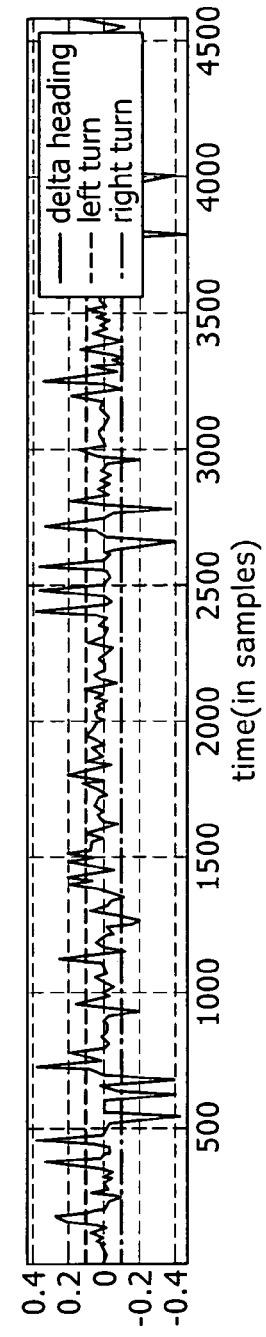
FIG. 8A  Impulse pitch  WALK PACE
OBTAIN WALK FREQUENCY FROM ACCELERATION SENSOR DATA
FIG. 8B  Impulse magnitude  WALK INTENSITY
OBTAIN WALK INTENSITY, OR IMPULSE MAGNITUDE FROM ACCELERATION SENSOR DATA
FIG. 8C  Heading  OBTAIN GRAVITY AXIS, AND OBTAIN ANGLE OF ROTATION ABOUT GRAVITY AXIS FROM GYRO SENSOR DATA

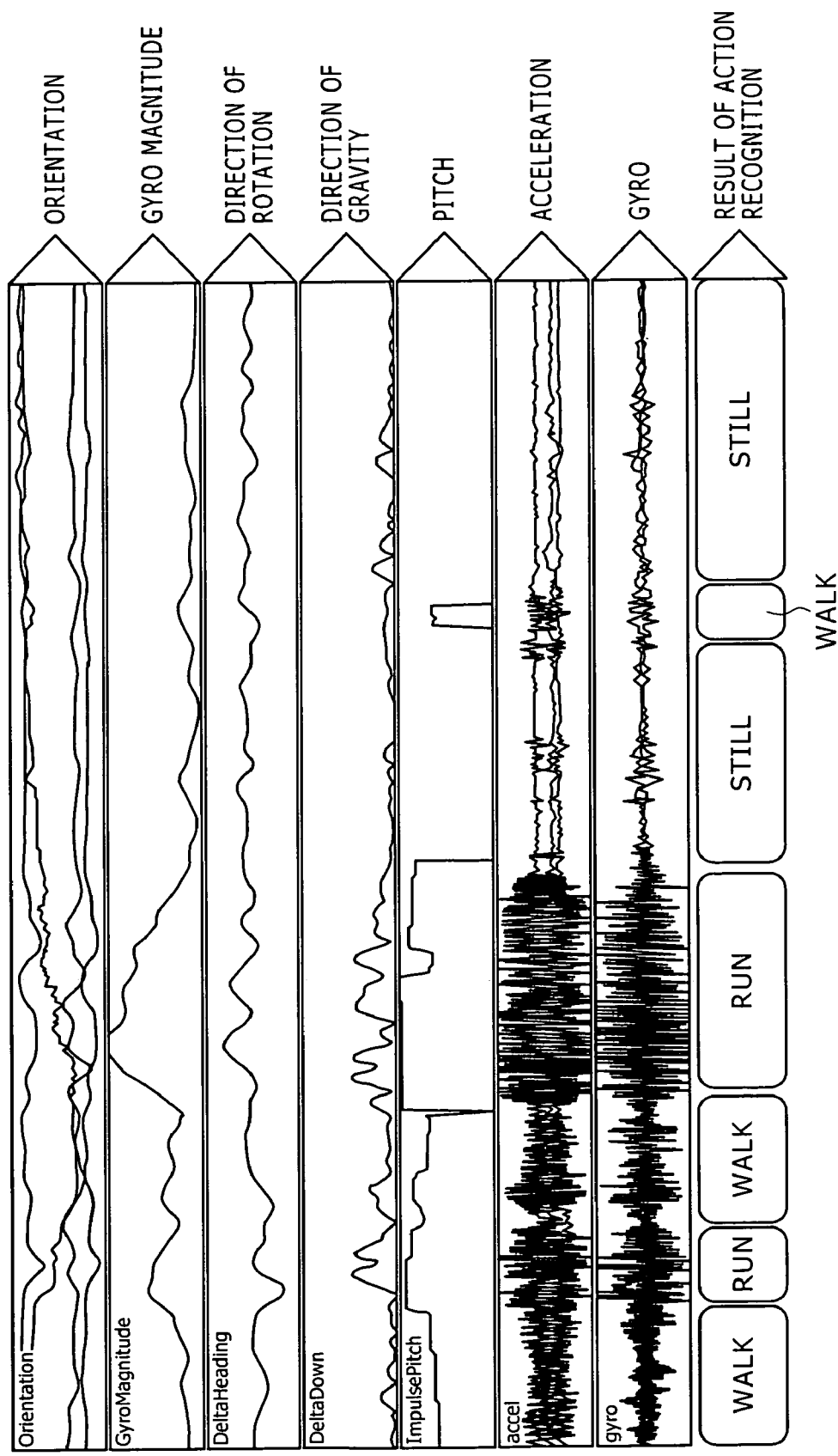

FIG.11

| TOOL / ACTION | | TELEPHONE | ELECTRONIC MAIL | ELECTRONIC MAIL (reply) | SMS | SMS(reply) | CHAT |
|---|---|---|---|---|---|---|---|
| WALKING | WEEKDAY DAYTIME | ○ | ○ | ○ | ○ | × | × |
| WALKING | WEEKDAY NIGHTTIME | ○ | ○ | ○ | ○ | × | × |
| WALKING | HOLIDAY DAYTIME | ○ | ○ | ○ | ○ | ○ | △ |
| WALKING | HOLIDAY NIGHTTIME | ○ | ○ | ○ | ○ | ○ | △ |
| RUNNING | WEEKDAY DAYTIME | × | ○ | × | ○ | × | × |
| RUNNING | WEEKDAY NIGHTTIME | × | ○ | × | ○ | × | × |
| RUNNING | HOLIDAY DAYTIME | × | ○ | × | ○ | × | × |
| RUNNING | HOLIDAY NIGHTTIME | × | ○ | × | ○ | × | × |
| SITTING | WEEKDAY DAYTIME | × | ○ | ○ | ○ | ○ | × |
| SITTING | WEEKDAY NIGHTTIME | ○ | ○ | ○ | ○ | ○ | ○ |
| SITTING | HOLIDAY DAYTIME | ○ | ○ | ○ | ○ | ○ | ○ |
| SITTING | HOLIDAY NIGHTTIME | ○ | ○ | ○ | ○ | ○ | ○ |
| STANDING | WEEKDAY DAYTIME | △ | ○ | △ | ○ | △ | △ |
| STANDING | WEEKDAY NIGHTTIME | ○ | ○ | ○ | ○ | ○ | ○ |
| STANDING | HOLIDAY DAYTIME | ○ | ○ | ○ | ○ | ○ | ○ |
| STANDING | HOLIDAY NIGHTTIME | ○ | ○ | ○ | ○ | ○ | ○ |
| VEHICLE | WEEKDAY DAYTIME | × | ○ | ○ | ○ | ○ | × |
| VEHICLE | WEEKDAY NIGHTTIME | × | ○ | ○ | ○ | ○ | × |
| VEHICLE | HOLIDAY DAYTIME | × | ○ | ○ | ○ | ○ | × |
| VEHICLE | HOLIDAY NIGHTTIME | × | ○ | ○ | ○ | ○ | × |
| ⋯ | | | | | | | |

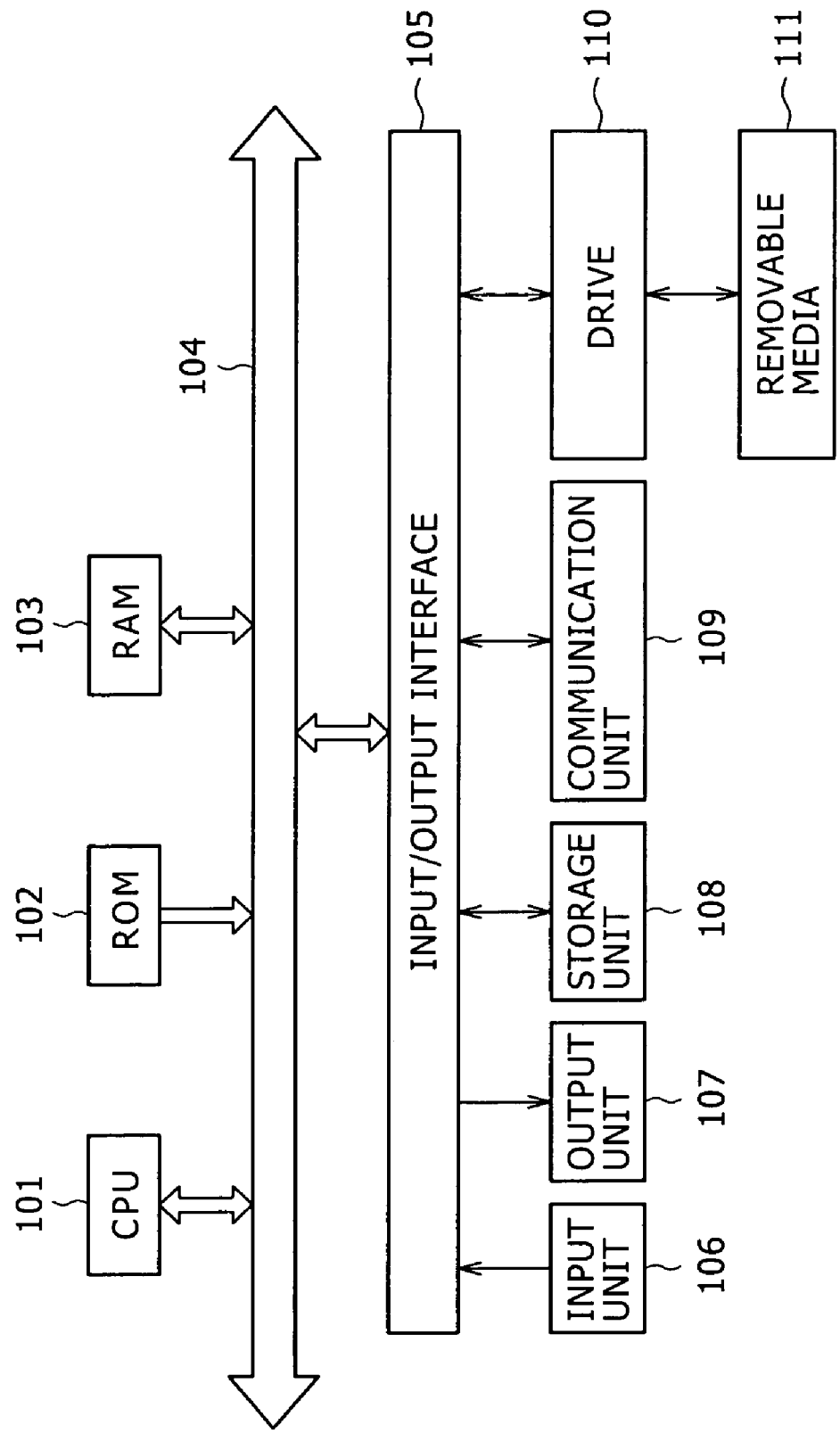

INFORMATION PROCESSING DEVICE AND METHOD, AND PROGRAM

CROSS REFERENCES TO RELATED APPLICATIONS

The present invention contains subject matter related to Japanese Patent Application JP 2005-169505 filed with the Japanese Patent Office on Jun. 9, 2005, the entire contents of which being incorporated herein by reference.

BACKGROUND OF THE INVENTION

1. Field of the Invention

The present invention relates to a device and a method for information processing, and a program, and particularly to a device and a method for information processing, and a program that make it possible to know the present state of a user with whom to communicate and perform processing according to the state of the user.

2. Description of Related Art

"What are you doing now?" This phrase is often used as an inquiry made to a person at another end of a telephone call immediately after the telephone call is started by portable telephone or the like. When there is a reply "I am getting on a train" in response to the inquiry, the caller for example says to the person at the other end of the telephone call, "I will call you later," and hangs up.

Japanese Patent Laid-open No. 2005-57706 (hereinafter referred to as Patent Document 1) discloses a technique that extracts a next time when a user terminal can perform communication from schedule information, and manages the schedule information on a server.

SUMMARY OF THE INVENTION

Such exchanges are often made on a daily basis. It is therefore considered that when the present state of a person to be called can be checked before a telephone call is made, it eliminates a need for making almost meaningless exchanges as described above and is thus convenient.

It is possible to avoid making a telephone call at a time inconvenient for the person to be called by sending a message stating that a telephone call is desired to be made by using an electronic mail function of a portable telephone before the telephone call is made and making a telephone call when a permission is obtained in reply. However, it is troublesome to send electronic mail to obtain a permission.

In addition, when parents desire to know what their children are doing outside, for example, it may be unnecessary to make a call or send electronic mail, but the state of another person (a child in this case) may be desired to be known. In such a case, it is convenient if the present state of the other person can be checked.

According to the technique disclosed in Patent Document 1, a user can access a server to check a schedule (a next time when communication is possible) of a user of a user terminal, but cannot check the present state of the user of the user terminal in real time.

The present invention has been made in view of the above. It is desirable to make it possible to know the present state of a user with whom to communicate and perform processing according to the state of the user.

According to a first embodiment of the present invention, there are provided an information processing device, an information processing method, and a program including a selecting means/step for selecting a communication tool corresponding to the action of a user of another information processing device, the action of the user being indicated by action information, as a tool used for communication with the user of the other information processing device on a basis of correspondence relation, and executing an application that manages the selected communication tool.

In the information processing device, the information processing method, and the program, a communication tool corresponding to the action of a user of another information processing device, the action of the user being indicated by action information, is selected as a tool used for communication with the user of the other information processing device on a basis of correspondence relation, and an application that manages the selected communication tool is executed.

According to a second embodiment of the present invention, there are provided an information processing device, an information processing method, and a program including a predicting means/step for predicting one of a time of arrival at a predetermined destination of a user of another information processing device and a time to be taken before the user of the other information processing device arrives at the predetermined destination on a basis of action information.

In the information processing device, the information processing method, and the program, one of a time of arrival at a predetermined destination of a user of another information processing device and a time to be taken before the user of the other information processing device arrives at the predetermined destination is predicted on a basis of action information.

According to a third embodiment of the present invention, there are provided an information processing device, an information processing method, and a program including a display controlling means/step for displaying a character performing the same action as action of a user of another information processing device, the action of the user being indicated by action information, in a vicinity of a transmitted image.

In the information processing device, the information processing method, and the program, a character performing the same action as action of a user of another information processing device, the action of the user being indicated by action information, is displayed in a vicinity of a transmitted image.

According to the present invention, it is possible to know the present state of a user with whom to communicate. In addition, it is possible to perform processing according to the state of the user.

BRIEF DESCRIPTION OF THE DRAWINGS

FIG. 5 is a diagram showing an example of results of recognition;

FIG. 6 is a block diagram showing an example of hardware configuration of a portable telephone 1;

FIG. 7 is a block diagram showing an example of software configuration of the portable telephone 1;

FIGS. 8A, 8B, and 8C are diagrams showing an example of feature data;

FIG. 10 is a diagram showing an example of sensor data, feature quantities, and a result of recognition in time series;

FIG. 11 is a diagram showing an example of a recommendation table;

FIG. 19 is a block diagram showing an example of configuration of a personal computer.

DETAILED DESCRIPTION OF THE PREFERRED EMBODIMENTS

Figure 1:
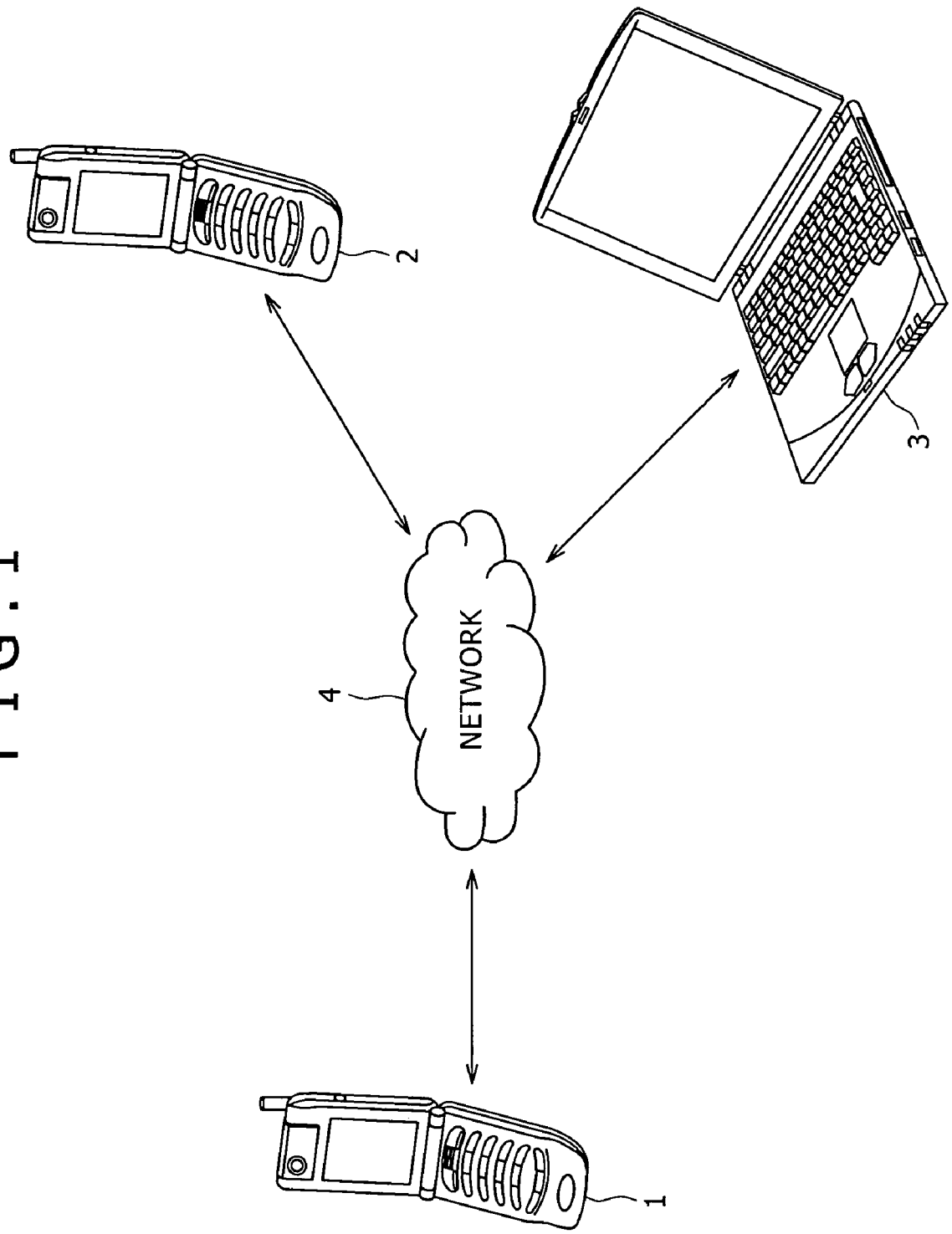
FIG. 1 is a diagram showing an example of configuration of a communication system according to an embodiment of the present invention.

Preferred embodiments of the present invention will hereinafter be described. Correspondences between inventions described in the present specification and embodiments of the inventions are illustrated as follows. This description is to confirm that embodiments supporting the inventions described in claims are described in the present specification. Therefore, even when there is an embodiment described in the embodiments of the inventions but not described here as corresponding to an invention, it does not signify that the embodiment does not correspond to that invention. Conversely, even when an embodiment is described here as corresponding to an invention, it does not signify that the embodiment does not correspond to inventions other than that invention.

Further, this description does not represent all the inventions described in the present specification. In other words, this description does not negate presence of inventions described in the present specification but not claimed in the present application, that is, presence of inventions to be claimed in a divisional application or to be added by amendments in the future.

According to an embodiment of the present invention, an information processing device (for example a portable telephone 2 in FIG. 1) connected via a network to another information processing device (for example a portable telephone 1 in FIG. 1) that recognizes action of a user on a basis of an output of a sensor incorporated in the other information processing device and transmits action information (for example presence state information) indicating the recognized action of the user includes: managing means and selecting means. The managing means (for example a table DB 44 in FIG. 7) manages correspondence relation (for example a recommendation table in FIG. 11) between each action recognizable in the other information processing device and communication tools. The selecting means (for example a communication means selection processing unit 43 in FIG. 7) selects a communication tool corresponding to the action of the user of the other information processing device, the action of the user being indicated by the action information, as a tool used for communication with the user of the other information processing device on a basis of the correspondence relation managed by the managing means, and executing an application that manages the selected communication tool.

According to an embodiment of the present invention, an information processing method of an information processing device (for example a portable telephone 2 in FIG. 1) connected via a network to another information processing device (for example a portable telephone 1 in FIG. 1) that recognizes action of a user on a basis of an output of a sensor incorporated in the other information processing device and transmits action information (for example presence state information) indicating the recognized action of the user includes the step of selecting. The step (for example step S23 in FIG. 14) selects a communication tool corresponding to the action of the user of the other information processing device, the action of the user being indicated by the action information, as a tool used for communication with the user of the other information processing device on a basis of correspondence relation (for example a recommendation table in FIG. 11) between each action recognizable in the other information processing device and communication tools. The step executes an application that manages the selected communication tool.

In a program according to an embodiment of the present invention, an embodiment (one example) to which each step corresponds is the same as in the information processing method according to the foregoing embodiment of the present invention.

According to an embodiment of the present invention, an information processing device (for example a portable telephone 2 in FIG. 1) is connected via a network to another information processing device (for example a portable telephone 1 in FIG. 1). This information processing device (for example a portable telephone 1 in FIG. 1) recognizes action of a user on a basis of an output of a sensor incorporated in the other information processing device and transmits action information (for example presence state information) indicating the recognized action of the user together with information indicating a present location. The information processing device (for example a portable telephone 2 in FIG. 1) includes predicting means (for example an action prediction processing unit 45 in FIG. 7) for predicting one of a time of arrival at a predetermined destination of the user of the other information processing device and a time to be taken before the user of the other information processing device arrives at the predetermined destination on a basis of the action information.

According to an embodiment of the present invention, in an information processing method, an information processing device (for example a portable telephone 2 in FIG. 1) is connected via a network to another information processing device (for example a portable telephone 1 in FIG. 1). Another information processing device (for example a portable telephone 1 in FIG. 1 recognizes action of a user on a basis of an output of a sensor incorporated in the other information processing device and transmits action information (for example presence state information) indicating the recognized action of the user together with information indicating a present location. The information processing method includes the step of predicting (for example step S43 in FIG. 16) one of a time of arrival at a predetermined destination of the user of the other information processing device and a time to be taken before the user of the other information processing device arrives at the predetermined destination on a basis of the action information.

In a program according to an embodiment of the present invention, an embodiment (one example) to which each step corresponds is the same as in the information processing method according to the foregoing embodiment of the present invention.

According to an embodiment of the present invention, an information processing device (for example a portable telephone 2 in FIG. 1) is connected via a network to another information processing device (for example a portable telephone 1 in FIG. 1). Another information processing device (for example a portable telephone 1 in FIG. 1) recognizes action of a user on a basis of an output of a sensor incorporated in the other information processing device and transmits action information (for example presence state information) indicating the recognized action of the user together with a taken image. The information processing device (for example a portable telephone 2 in FIG. 1) includes display controlling means (for example a Buddy presence state recognition processing unit 42 in FIG. 7) for displaying a character performing the same action as the action of the user of the other information processing device, the action of the user being indicated by the action information, in a vicinity of the transmitted image.

According to an embodiment of the present invention, in an information processing method, an information processing device (for example a portable telephone 2 in FIG. 1) is connected via a network to another information processing device (for example a portable telephone 1 in FIG. 1). Another information processing device (for example a portable telephone 1 in FIG. 1) recognizes action of a user on a basis of an output of a sensor incorporated in the other information processing device and transmits action information (for example presence state information) indicating the recognized action of the user together with a taken image. The information processing method includes the step (for example step S64 in FIG. 18) of displaying a character performing the same action as the action of the user of the other information processing device, the action of the user being indicated by the action information, in a vicinity of the transmitted image.

In a program according to an embodiment of the present invention, an embodiment (one example) to which each step corresponds is the same as in the information processing method according to the foregoing embodiment of the present invention.

Embodiments of the present invention will hereinafter be described with reference to the drawings.

FIG. 1 is a diagram showing an example of configuration of a communication system according to an embodiment of the present invention.

In the communication system of FIG. 1, a portable telephone 1 and a portable telephone 2 are connected to each other via a network 4 so as to be able to communicate with each other. In addition, the portable telephone 1 and a personal computer 3 are connected to each other via the network 4 so as to be able to communicate with each other.

The portable telephone 1 includes sensors such as an acceleration sensor, a gyro sensor and the like. The portable telephone 1 recognizes the action of a user having the portable telephone 1 on the basis of sensor data (acceleration sensor data, gyro sensor data and the like) obtained by the incorporated sensors, and transmits presence state information including information (action information) indicating the recognized action of the user to the portable telephone 2 and the personal computer 3 via the network 4 in a predetermined cycle.

For example, the portable telephone 1 recognizes an action such as "walk", "run", "standing still", "riding a vehicle", and the like as the action of the user of the portable telephone 1.

The portable telephone 2 and the personal computer 3 receiving the presence state information from the portable telephone 1 are provided with animation data of characters performing respective actions such as "walk", "run", "standing still", "riding a vehicle", and the like. When the presence state information is transmitted from the portable telephone 1, an animation corresponding to the present action of the user of the portable telephone 1 which action is indicated by the presence state information is displayed on the respective screens of the portable telephone 2 and the personal computer 3, for example.

FIGS. 2A to 2D are diagrams showing an example of the characters whose data is provided to the portable telephone 2 and the personal computer 3. The characters of FIGS. 2A to 2D respectively express "walk", "run", "standing still", and "riding a vehicle".

The character display is changed as occasion arises each time presence state information is transmitted from the portable telephone 1. For example, when the user of the portable telephone 1 in a walking state starts running, the character display is changed from the character of FIG. 2A to the character of FIG. 2B on the screens of the portable telephone 2 and the personal computer 3 on the basis of the presence state information transmitted at this time.

Figure 2A:
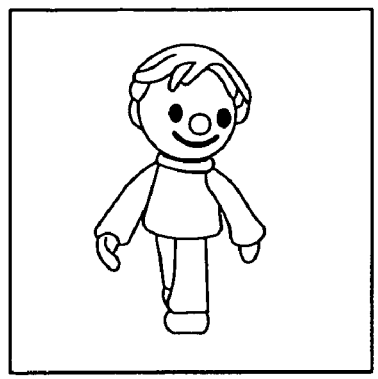
FIGS. 2A, 2B, 2C, and 2D are diagrams showing an example of characters.
Figure 2B:
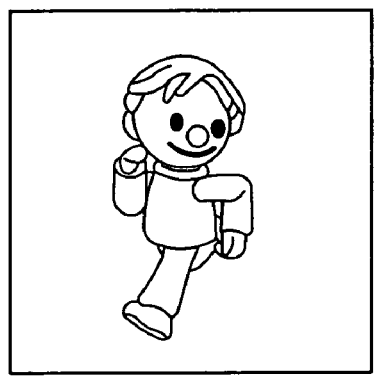
Figure 2C:
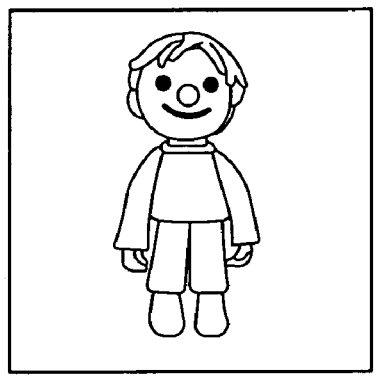
Figure 2D:

By viewing such an animation, a user of the portable telephone 2 or a user of the personal computer 3 knows the present state of the user of the portable telephone 1. For example, the user of the portable telephone 2 checks the display of an animation before making a call, and when the user of the portable telephone 1 is riding a vehicle (when the animation of FIG. 2D is displayed), the user of the portable telephone 2 refrains from making a call. Thus, the user of the portable telephone 2 can avoid making a call at a time inconvenient to the user of the portable telephone 1.

Figure 3:
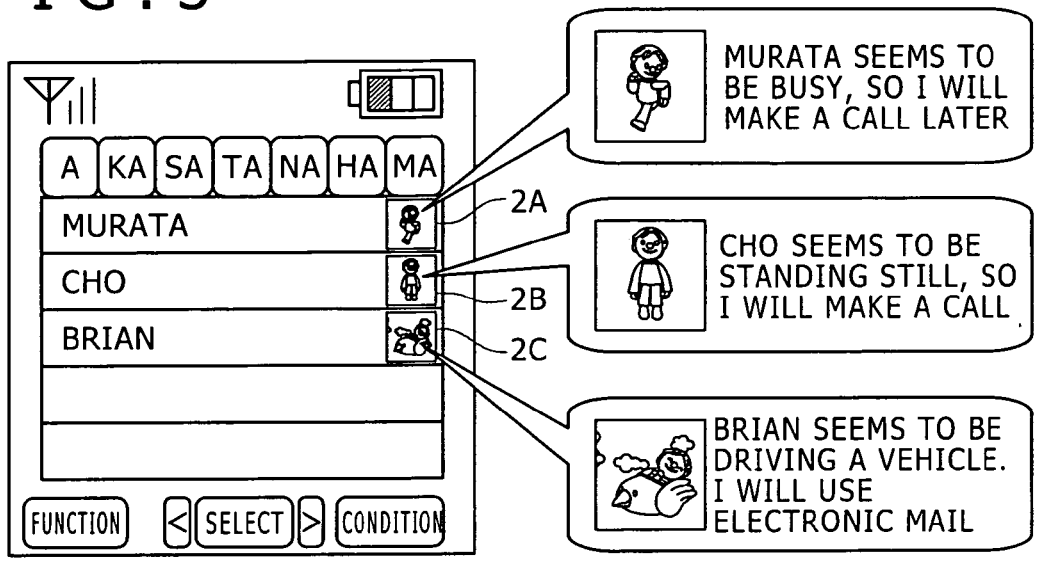
FIG. 3 is a diagram showing an example of a screen displayed on a portable telephone 2.

FIG. 3 is a diagram showing an example of a screen displayed on the portable telephone 2.

In the example of FIG. 3, characters 2A to 2C expressing actions recognized from presence state information transmitted from respective devices possessed by "Murata", "Cho", and "Brian" are displayed on the right of the names of "Murata", "Cho", and "Brian", which names are registered in an address book. In the communication system of FIG. 1, a plurality of devices having similar functions to those of the portable telephone 1 are connected to the network 4, and as shown in FIG. 3, animations representing the actions of a plurality of people are respectively displayed on the basis of presence state information transmitted from these devices.

In the example of FIG. 3, the character 2A indicates that "Murata" is running now. From this indication, the user of the portable telephone 2 can recognize that "Murata" is busy, and decide to make a call later.

In the example of FIG. 3, the character 2B indicates that "Cho" is standing still now. From this indication, the user of the portable telephone 2 can recognize that "Cho" is standing still, and decide to make a call now.

Similarly, in the example of FIG. 3, the character 2C indicates that "Brian" is riding a vehicle now. From this indication, the user of the portable telephone 2 can recognize that "Brian" is riding a vehicle, and decide to communicate a message by electronic mail rather than by telephone.

Figure 4:
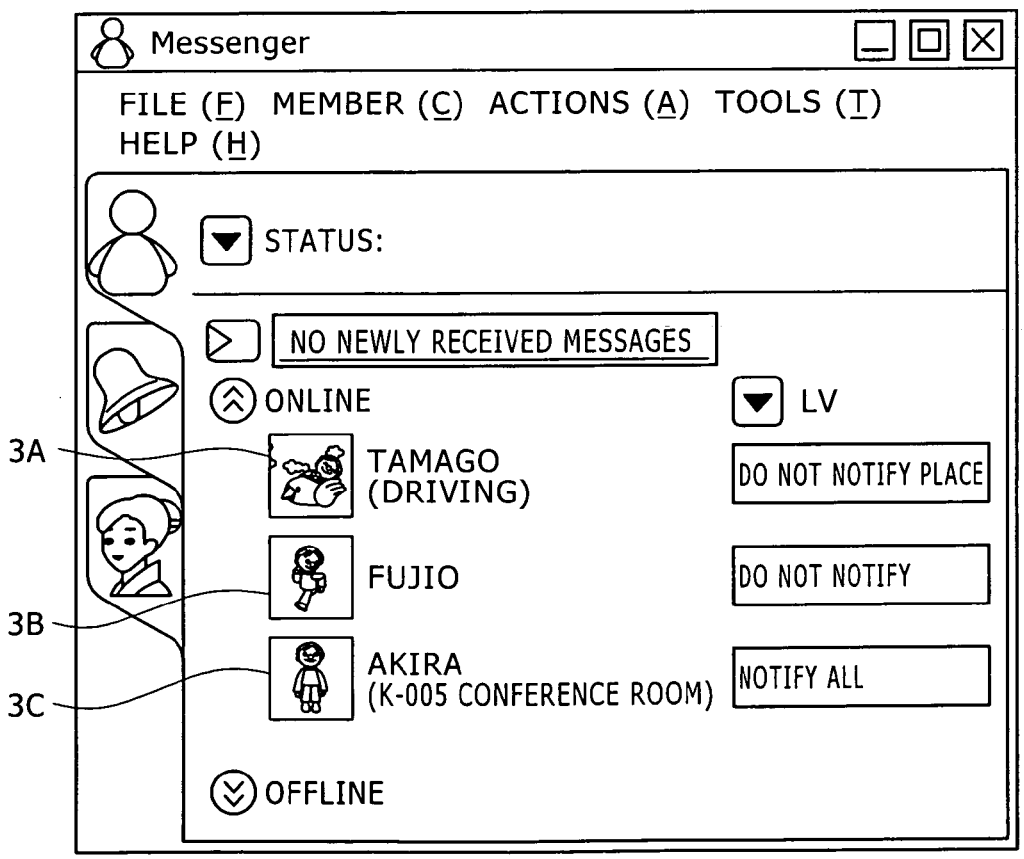
FIG. 4 is a diagram showing an example of a screen displayed on a personal computer 3.

FIG. 4 is a diagram showing an example of a screen displayed on the personal computer 3 (display of a window).

In the example of FIG. 4, an instant message window is displayed. In the window, characters expressing actions recognized from presence state information transmitted from respective devices possessed by "Tamago", "Fujio", and "Akira" are displayed.

In the example of FIG. 4, the character 3A indicates that "Tamago" is riding a vehicle now. The character 3B indicates that "Fujio" is running now.

The character 3C indicates that "Akira" is standing still now. In the example of FIG. 4, characters "K-005 conference room" are displayed next to the name of "Akira". This is displayed on the basis of information on the location of "Akira" which information is included in the presence state information and transmitted from his device.

Thus, the presence state information can include not only the information indicating the action of the user but also various other kinds of information and be transmitted to other devices.

In the example of FIG. 4, characters "DO NOT NOTIFY LOCATION", "DO NOT NOTIFY", and "NOTIFY ALL" are displayed as respective setting conditions of "Tamago", "Fujio", and "Akira" at a right edge of the window. The setting conditions indicate which of transmitted information included in the presence state information is to be displayed on another device (a device receiving the presence state information).

For example, since "NOTIFY ALL" is set for "Akira", the personal computer 3 displays not only the character 3C expressing the action of "Akira" but also the location of "Akira" on the basis of information transmitted from the device of "Akira" which information is included in the presence state information. That is, the user of the device as transmitting source of the presence state information can set an extent to which information is disclosed on a device receiving the presence state information. The presence state information includes information indicating the setting condition.

The functions of the portable telephone 2 and the personal computer 3 of displaying the screens as shown in FIG. 3 and FIG. 4 on the basis of the transmitted presence state information as described above are also provided to the portable telephone 1. Conversely, the functions of the portable telephone 1 of recognizing action on the basis of an output from the incorporated sensors and transmitting presence state information including information indicating the recognized action to other devices are also provided to the portable telephone 2 and the personal computer 3.

Hence, the user of the portable telephone 1 can also check the states of the user of the portable telephone 2 and the user of the personal computer 3 from the screen displayed in the portable telephone 1.

Incidentally, in the above example, the device as transmitting source of the presence state information can recognize four actions of "walk", "run", "standing still", and "riding a vehicle". The device as transmitting source of the presence state information may recognize actions other than "walk", "run", "standing still" and "riding a vehicle" on the basis of sensor data obtained by not only the acceleration sensor and the gyro sensor but also various sensors such as a sensor for sound collected by a microphone and the like, a present time and the like.

FIG. 5 is a diagram showing an example of results of recognition.

For example, as shown on the left side of FIG. 5, in a case of a state as represented as status $S_1$ in which information indicating "quiet" is obtained from the sound volume of sound collected by a microphone, information indicating that the present time is "daytime" is obtained from the output of a clock, and information indicating "no movement" is obtained from the outputs of the acceleration sensor and the gyro sensor, it is determined that the present action (state) of the user is "being idle". Presence state information including information indicating that the present state of the user is "being idle" is transmitted.

A device receiving the presence state information determines that the user of the transmitting source of the presence state information is "being idle" and is thus able to have a chat now, and executes an application managing chats automatically (without an operation by a user). As will be described later, the device receiving the presence state information automatically selects a tool for communicating with the user of the transmitting source of the presence state information according to the present state of the user of the transmitting source of the presence state information.

As shown at the center of FIG. 5, for example, in a case of a state as represented as status $S_2$ in which information indicating "quiet" is obtained from the sound volume of sound collected by the microphone, information indicating that the present time is "nighttime" is obtained from the output of the clock, and information indicating "no movement" is obtained from the outputs of the acceleration sensor and the gyro sensor, it is determined that the present state of the user is "sleeping". Presence state information including information indicating that the present state of the user is "sleeping" is transmitted.

A device receiving the presence state information determines that the user of the transmitting source of the presence state information is "sleeping" and is thus unable to have a chat now. In this case, the device determines that electronic mail processing can be performed, for example, and executes an application managing electronic mail (a mailer).

Similarly, as shown on the right side of FIG. 5, for example, in a case of a state as represented as status $S_3$ in which it is determined from the outputs of the acceleration sensor and the gyro sensor that the user of the transmitting source of the presence state information is dashing furiously, presence state information including information indicating that the user of the transmitting source of the presence state information is dashing furiously is transmitted.

A device receiving the presence state information determines that the user of the transmitting source of the presence state information is "dashing furiously" and is thus unable to have a chat nor receive a call now. Also in this case, the device determines that electronic mail processing can be performed, for example, and starts the mailer.

The operation of each device that transmits or receives presence state information and performs processing according to the state of the user of another device as described above will be described later with reference to a flowchart.

FIG. 6 is a block diagram showing an example of hardware configuration of the portable telephone 1 in FIG. 1.

A sensor unit 11 includes an acceleration sensor, a gyro sensor, a GPS (Global Positioning System) sensor and the like. The sensor unit 11 performs measurement in predetermined cycles, and outputs sensor data such as acceleration sensor data, gyro sensor data, GPS sensor data and the like as results of the measurement to an action recognizing unit 12 and a main processing unit 13. The acceleration sensor forming the sensor unit 11 can measure acceleration in the directions of three axes orthogonal to each other, for example. The gyro sensor can measure angular velocity about the three axes orthogonal to each other, for example.

As will be described later in detail, the action recognizing unit 12 extracts features from the sensor data supplied from the sensor unit 11, and recognizes the action of the user on the basis of a time series of the extracted features referring to an HMM (Hidden Markov Model) prepared in advance. The action recognizing unit 12 outputs information indicating a result of the recognition to the main processing unit 13.

The main processing unit 13 controls the operation of the whole of the portable telephone 1. The main processing unit 13 for example generates presence state information including the information indicating the result of the action recognition which information is supplied from the action recognizing unit 12, and makes the generated presence state information transmitted from a communication unit 14 to a device registered in advance. For example, a device registered in an address book or a device registered in an application managing instant messages is selected as transmission destination.

In addition, when presence state information transmitted from another device is received by the communication unit 14 and supplied to the main processing unit 13, the main processing unit 13 recognizes the action of a user of the other device, and displays a character expressing the recognized action on a display unit 15. Further, the main processing unit 13 selects a tool (communication means) used for communication with the user of the other device according to the action of the user of the other device which action is indicated by the presence state information transmitted from the other device, and executes an application managing the selected communication tool.

As will be described later, the main processing unit 13 is provided with a recommendation table showing correspondences between each action and communication tools suitable for use in the case of each action. The recommendation table is referred to, and a communication tool suitable for the present action of the user of the other device is selected.

The communication unit 14 transmits information supplied from the main processing unit 13 to another device via the network 4, and receives information transmitted from another device via the network 4 and outputs the information to the main processing unit 13.

The display unit 15 is formed by an LCD (Liquid Crystal Display) or the like. The display unit 15 displays a character (a screen where a character is displayed) and the like under control of the main processing unit 13.

A storage unit 16 is formed by an HDD (Hard Disk Drive) or the like. The storage unit 16 stores various kinds of data such as data for displaying characters and the like.

FIG. 7 is a block diagram showing an example of software configuration (example of functional configuration) of the portable telephone 1. At least a part of functional units shown in FIG. 7 are implemented by the main processing unit 13 in FIG. 6 executing a predetermined program.

Hereinafter, as appropriate, the state (action) of the user of the portable telephone 1 which state is handled by the portable telephone 1 will be referred to as My presence state. The state of the user of another device such as the portable telephone 2, the personal computer 3 or the like which user is a buddy of the user of the portable telephone 1 will be referred to as a Buddy presence state (conversely, as viewed from the user of the portable telephone 2, the state of the user of the portable telephone 2 is My presence state, and the state of the user of another device such as the portable telephone 1, the personal computer 3 or the like which user is a buddy of the user of the portable telephone 2 is a Buddy presence state).

As shown in FIG. 7, the portable telephone 1 basically includes a transmission processing unit 21 for transmitting presence state information to another device and a reception processing unit 22 for performing various kinds of processing on the basis of presence state information transmitted from another device.

The transmission processing unit 21 includes a feature extraction processing unit 31, an action recognition processing unit 32, an HMM DB 33, a My presence state recognition processing unit 34, and a presence state information transmitting unit 35. Of these parts, the feature extraction processing unit 31, the action recognition processing unit 32, and the HMM DB 33 enclosed by a solid line are implemented by the action recognizing unit 12 in FIG. 6.

The feature extraction processing unit 31 for example extracts features from acceleration sensor data supplied from the acceleration sensor and gyro sensor data supplied from the gyro sensor. The feature extraction processing unit 31 outputs feature data indicating the extracted features to the action recognition processing unit 32.

Specifically, as shown in FIG. 8A, the feature extraction processing unit 31 obtains a walk frequency (Impulse pitch) as one feature from the acceleration sensor data. In a sample result of FIG. 8A, an axis of abscissas represents time (number of samples of the acceleration sensor 11), and an axis of ordinates represents frequency (Hz). The frequency measured by the acceleration sensor when a person walks is generally 2 Hz (two steps per second). Thus, a "walk" as a result of recognition is obtained from a time series of results of the measurement of 2 Hz or the like, referring to an HMM.

In addition, as shown in FIG. 8B, the feature extraction processing unit 31 obtains a walk intensity, or an Impulse magnitude as one feature from the acceleration sensor data. In a sample result of FIG. 8B, an axis of abscissas represents time, and an axis of ordinates represents intensity.

Further, as shown in FIG. 8C, the feature extraction processing unit 31 obtains a gravity axis from the acceleration sensor data, and obtains, as one feature, an angle of rotation (Heading) about the gravity axis which angle of rotation is obtained from the gyro sensor data. The output is zero when the acceleration sensor detects an acceleration in a horizontal direction with respect to the gravity axis, whereas a predetermined value is measured when the acceleration sensor detects an acceleration in a direction other than the horizontal direction with respect to the gravity axis. Thus, when acceleration in the three axial directions can be measured, as described above, the gravity axis can be obtained from a result of measurement of the acceleration in the directions. Incidentally, in a sample result of FIG. 8C, an axis of abscissas represents time, and an axis of ordinates represents the angle of rotation.

For example, the feature extraction processing unit 31 extracts the various features as described above on the basis of the sensor data. The feature data indicating the extracted features is output to the action recognition processing unit 32 sequentially each time a feature is extracted.

The action recognition processing unit 32 accumulates a predetermined amount of the feature data supplied from the feature extraction processing unit 31, and recognizes the action of the user of the portable telephone 1 on the basis of a time series of the accumulated feature data, referring to the HMM provided in the HMM DB 33.

The HMM DB 33 is provided in advance with such models. For example, one model is used to recognize a "walk" which model is created on the basis of features extracted from acceleration sensor data and gyro sensor data when a person is walking. One model is used to recognize a "run" which model is created on the basis of features extracted from acceleration sensor data and gyro sensor data when a person is running. One model is used to recognize "standing still" which model is created on the basis of features extracted from acceleration sensor data and gyro sensor data when a person is standing still. Another model is used to recognize "riding a vehicle"

which model is created on the basis of features extracted from acceleration sensor data and gyro sensor data when a person is riding a vehicle.

Information indicating a result of the recognition of the action such as "walk", "run", "standing still", "riding a vehicle", and the like recognized by the action recognition processing unit 32 is output to the My presence state recognition processing unit 34.

Figure 9:
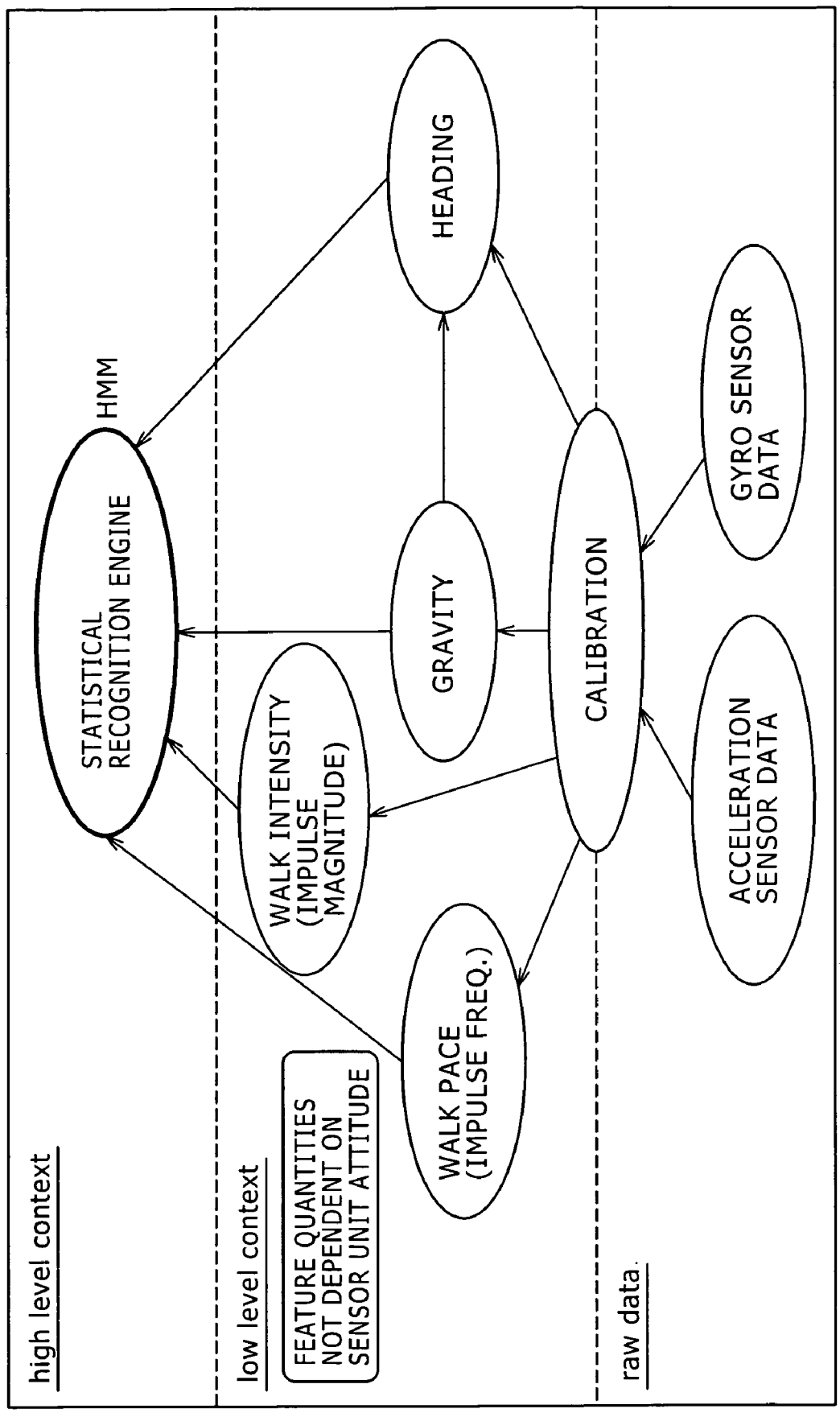
FIG. 9 is a diagram schematically showing action recognition.

FIG. 9 is a diagram schematically showing action recognition by the action recognizing unit 12.

Calibration is performed on acceleration sensor data and gyro sensor data as raw data. A walk pace, a walk intensity, gravity, and a heading direction as described above are obtained as feature quantities (low level context) from data resulting from the calibration. The HMM is referred to on the basis of the obtained feature quantities, and the action of the user (high level context) is statistically recognized.

It is to be noted that an action recognition algorithm is not limited to the above-described algorithm, and the action recognition may be performed by various algorithms.

FIG. 10 is a diagram showing an example of sensor data, feature quantities, and a result of recognition in time series.

In the example of FIG. 10, "walk", "run", "walk", "run", "standing still", "walk", and "standing still" are obtained in that order as a result of action recognition. Each such recognition result has added thereto a measurement time of the sensor data used to obtain the recognition result, for example, and is used as information indicating action as a part of presence state information.

Returning to the description of FIG. 7, the My presence state recognition processing unit 34 generates presence state information including the action recognition result supplied from the action recognition processing unit 32. The My presence state recognition processing unit 34 outputs the generated presence state information to the presence state information transmitting unit 35. The My presence state recognition processing unit 34 includes GPS sensor data and the like in the presence state information as occasion arises.

In addition, as appropriate, the My presence state recognition processing unit 34 displays an animation representing the state of the user of the portable telephone 1 on the display unit 15 on the basis of the action recognition result supplied from the action recognition processing unit 32.

The presence state information transmitting unit 35 controls the communication unit 14 to transmit the presence state information generated by the My presence state recognition processing unit 34 and supplied to the presence state information transmitting unit 35 to another device via the network 4.

The reception processing unit 22 includes a presence state information obtaining unit 41, a Buddy presence state recognition processing unit 42, a communication means selection processing unit 43, a table DB 44, and an action prediction processing unit 45.

The presence state information obtaining unit 41 receives presence state information transmitted from another device via the network 4. The presence state information obtaining unit 41 outputs the presence state information to the Buddy presence state recognition processing unit 42.

The Buddy presence state recognition processing unit 42 recognizes a Buddy presence state (the state of the user of the other device) on the basis of the presence state information supplied from the presence state information obtaining unit 41. The Buddy presence state recognition processing unit 42 displays an animation representing the Buddy presence state on the display unit 15.

In addition, the Buddy presence state recognition processing unit 42 outputs information indicating the recognized Buddy presence state to the communication means selection processing unit 43 and the action prediction processing unit 45. When GPS sensor data indicating a present location of the user of the other device is included in the presence state information transmitted from the other device, the Buddy presence state recognition processing unit 42 also outputs the GPS sensor data to the action prediction processing unit 45. As will be described later, the action prediction processing unit 45 determines for example a predicted time to be taken before the user of the device that included the GPS sensor data and the like in the presence state information and transmitted the presence state information arrives at a destination on the basis of the Buddy presence state and the GPS sensor data.

Further, when a tool to be used for communication with the user of the device that transmitted the presence state information is selected by the communication means selection processing unit 43 and information indicating the selected tool is supplied to the Buddy presence state recognition processing unit 42, the Buddy presence state recognition processing unit 42 displays for example a message indicating the selected communication tool on the display unit 15 as appropriate. The Buddy presence state recognition processing unit 42 presents the communication tool to the user of the portable telephone 1.

The communication means selection processing unit 43 selects a communication tool suitable as a tool for communication with the user of the other device referring to a recommendation table stored in the table DB 44 on the basis of the Buddy presence state recognized by the Buddy presence state recognition processing unit 42. The communication means selection processing unit 43 executes an application managing the selected communication tool.

FIG. 11 is a diagram showing an example of the recommendation table stored in the table DB 44.

In the example of the recommendation table of FIG. 11, an action in each time period (the day/night of a weekday or the day/night of a holiday) is associated with communication tools suitable when the user of the other device is performing that action. The example of FIG. 11 shows the telephone, electronic mail (electronic mail reply), SMS (Short Message Service) (SMS reply), and chat as communication tools provided to the portable telephone 1.

In FIG. 11, a circle indicates that the communication tool is suitable. A cross indicates that the communication tool is not suitable. A triangle indicates an in-between.

For example, when a time period is the day of a weekday and the recognized Buddy presence state is walking ("walk"), it is determined that the telephone, electronic mail (electronic mail reply), and SMS (Short Message Service) (SMS reply) other than the chat are suitable communication tools.

Hence, when it is thus recognized on the basis of the presence state information transmitted from the other device that the time period is the day of a weekday and the recognized Buddy presence state is walking, the communication means selection processing unit 43 selects one of the communication tools of the telephone, electronic mail (electronic mail reply), and SMS (Short Message Service) (SMS reply), and executes an application managing the communication tool. When it is thus determined that a plurality of communication tools are suitable, for example a tool of high priority set in advance by the user is selected.

Such a recommendation table is referred to and a tool corresponding to the present state of the user of the other device with which user to communicate is selected by the communication means selection processing unit 43. Incidentally, the example of FIG. 11 shows walking (above-described "walk"), running (above-described "run"), sitting, standing, and vehicle (above-described "riding a vehicle") as actions of the user of the other device.

Incidentally, as information indicating correspondences between actions and communication tools, various kinds of information such for example as a probabilistic model that receives an action as an input and outputs a communication tool corresponding to the action may be provided in place of the information in the form of the table as shown in FIG. 11.

Returning to the description of FIG. 7, on the basis of the Buddy presence state and the GPS sensor data, the action prediction processing unit 45 determines a predicted time to be taken before the user of the device that included the GPS sensor data and the like in the presence state information and transmitted the presence state information arrives at a destination, or a predicted time of arrival of the user at the destination. The action prediction processing unit 45 displays the determined predicted time to be taken or the determined predicted time of arrival on a map together with a history of actions of the user, for example.

Incidentally, not only the portable telephone 1 but also the portable telephone 2 and the personal computer 3 have the configurations shown in FIG. 6 and FIG. 7. Description will hereinafter be made quoting the configurations shown in FIG. 6 and FIG. 7 also as the configurations of the portable telephone 2 and the personal computer 3 as appropriate.

The operations of the portable telephone 1 and the portable telephone 2 will next be described with reference to flowcharts.

While in the description below, the portable telephone 1 is a device that transmits presence state information and the portable telephone 2 is a device that receives the presence state information, a process performed by the portable telephone 1 is also performed by the portable telephone 2 and the personal computer 3 as appropriate. In addition, a process performed by the portable telephone 2 is also performed by the portable telephone 1 and the personal computer 3 as appropriate.

Figure 12:
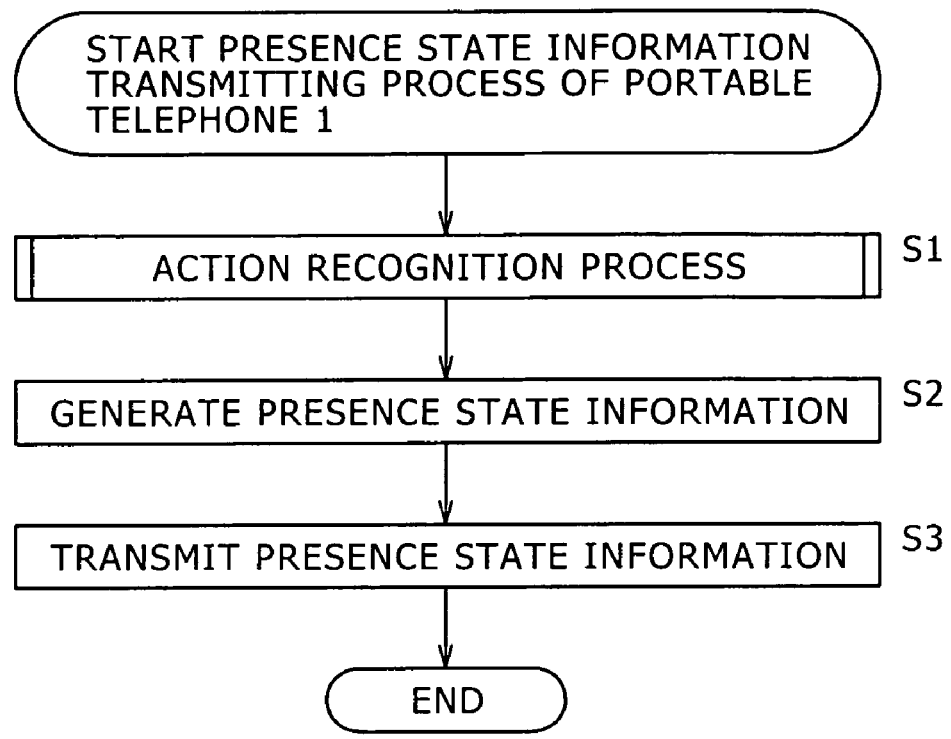
FIG. 12 is a flowchart of assistance in explaining a presence state information transmitting process of the portable telephone 1.

The process of the portable telephone 1 that transmits presence state information will first be described with reference to a flowchart of FIG. 12.

When measurement is performed by the various sensors under control of the main processing unit 13 of the portable telephone 1, and sensor data as a result of the measurement is supplied, the action recognizing unit 12 performs an action recognition process in step S1. While details of the action recognition process will be described later with reference to a flowchart of FIG. 13, the present action of the user of the portable telephone 1 is recognized by this process. Information indicating the recognized action is output from the action recognition processing unit 32 to the My presence state recognition processing unit 34.

In step S2, the My presence state recognition processing unit 34 generates presence state information including the information indicating a result of the action recognition which information is supplied from the action recognition processing unit 32, GPS sensor data and the like. The My presence state recognition processing unit 34 outputs the generated presence state information to the presence state information transmitting unit 35.

In step S3, the presence state information transmitting unit 35 transmits the presence state information generated by the My presence state recognition processing unit 34 to the portable telephone 2 via the network 4. Then the process is ended.

Such a process is repeated in predetermined cycles, whereby the user of the portable telephone 2 that receives the presence state information transmitted from the portable telephone 1 can check the state of the user of the portable telephone 1 in real time.

Figure 13:
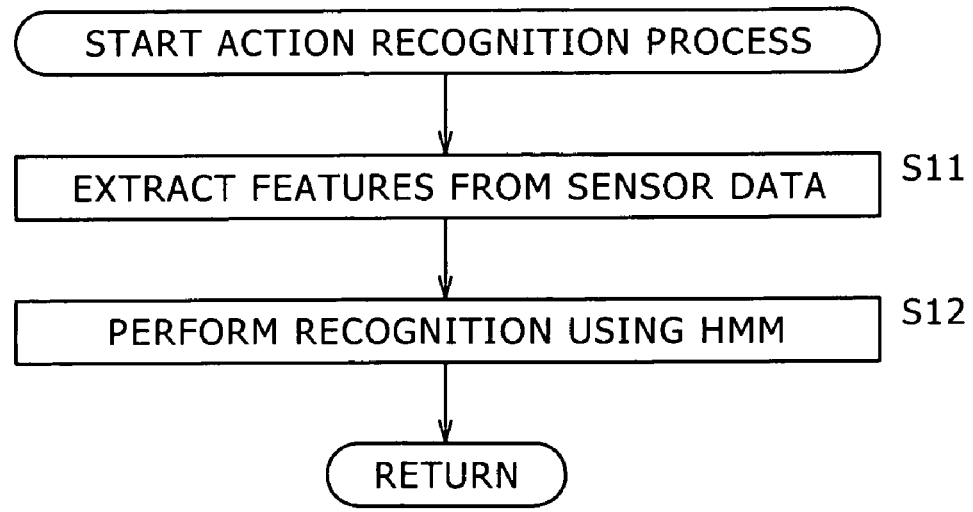
FIG. 13 is a flowchart of assistance in explaining details of an action recognition process performed in step S11 in FIG. 12.

Details of the action recognition process performed in step S1 in FIG. 12 will next be described with reference to a flowchart of FIG. 13.

In step S11, the feature extraction processing unit 31 in the action recognizing unit 12 extracts features such for example as a walk pace, a walk intensity, gravity, and a heading direction as described above from acceleration sensor data as an output of the acceleration sensor, gyro sensor data as an output of the gyro sensor, and the like. Feature data indicating the features extracted by the feature extraction processing unit 31 is output to the action recognition processing unit 32.

In step S12, the action recognition processing unit 32 accumulates a predetermined amount of the feature data supplied from the feature extraction processing unit 31, and recognizes the action of the user of the portable telephone 1 on the basis of a time series of the accumulated feature data, referring to the HMM provided in the HMM DB 33. The action recognition processing unit 32 outputs a result of the recognition to the My presence state recognition processing unit 34. Then the process is ended. Thereafter the process returns to step S1 in FIG. 12 to perform the process from step S1 on down.

Figure 14:
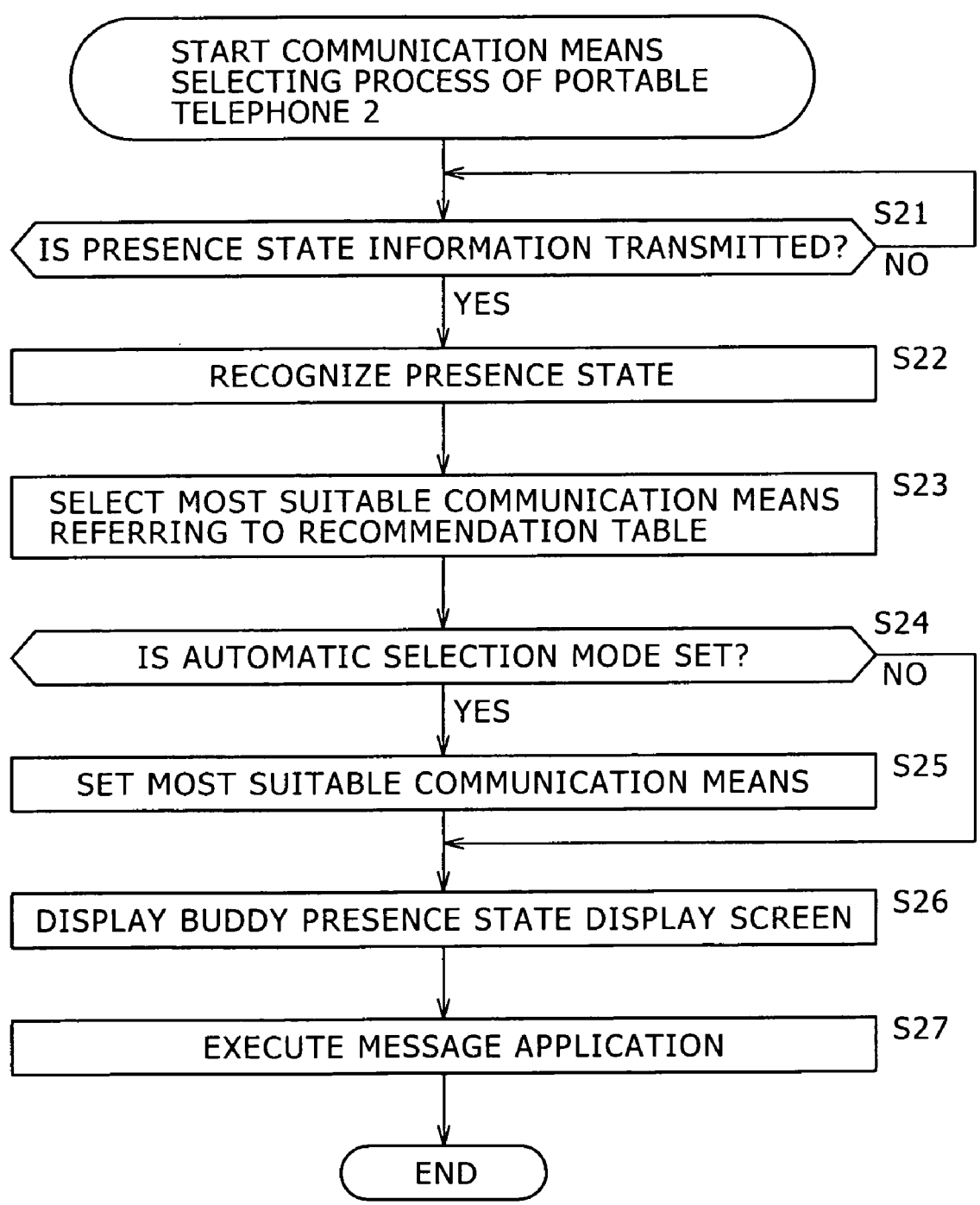
FIG. 14 is a flowchart of assistance in explaining a communication means selecting process of the portable telephone 2.

The process of the portable telephone 2 that selects a communication tool will next be described with reference to a flowchart of FIG. 14. This process is performed in response to the process of FIG. 12 by the portable telephone 1.

In step S21, a presence state information obtaining unit 41 of the portable telephone 2 determines whether the presence state information is transmitted, and stands by until the presence state information obtaining unit 41 determines that the presence state information is transmitted.

When the presence state information obtaining unit 41 determines in step S21 that the presence state information is transmitted, the process proceeds to step S22. The presence state information transmitted from the portable telephone 1 is output from the presence state information obtaining unit 41 to a Buddy presence state recognition processing unit 42.

In step S22, the Buddy presence state recognition processing unit 42 recognizes a Buddy presence state (the state of the user of the portable telephone 1) on the basis of the presence state information supplied from the presence state information obtaining unit 41. The Buddy presence state recognition processing unit 42 outputs information indicating the recognized Buddy presence state to a communication means selection processing unit 43.

In step S23, the communication means selection processing unit 43 selects a communication tool suitable for communication with the user of the portable telephone 1 on the basis of the Buddy presence state recognized by the Buddy presence state recognition processing unit 42, referring to the recommendation table stored in a table DB 44.

In step S24, the communication means selection processing unit 43 determines whether an automatic selection mode for automatically selecting a communication tool is set. When the communication means selection processing unit 43 determines that the automatic selection mode is set, the process proceeds to step S25.

In step S25, the communication means selection processing unit 43 sets the communication tool selected in step S23 as a tool for the user of the portable telephone 2 to communicate with the user of the portable telephone 1 by for example exchanging messages with the user of the portable telephone 1. When the communication means selection processing unit 43 determines in step S24 that the automatic selection mode is not set, the process of step S25 is skipped.

In step S26, the Buddy presence state recognition processing unit 42 displays, on the display unit 15, a Buddy presence state display screen as shown in FIG. 3 on which screen an animation expressing the state of the user of the portable telephone 1 which state is recognized in step S22 is displayed.

When for example the user of the portable telephone 2 gives an instruction to start exchanging messages or the like with the user of the portable telephone 1 in a state of the Buddy presence state display screen being displayed, the communication means selection processing unit 43 in step S27 executes an application managing the communication tool set in step S25.

Thus, the user of the portable telephone 2 can communicate with the user of the portable telephone 1 with a tool suitable for the present state of the user of the portable telephone 1.

The above description has been made mainly of the process of selecting a communication tool on the basis of the Buddy presence state as the state of the user of the portable telephone 1 which state is obtained on the basis of the presence state information. Description will next be made of a process of predicting a time of arrival of the user of the portable telephone 1 at a predetermined destination or a time to be taken before the user of the portable telephone 1 arrives at the predetermined destination on the basis of the Buddy presence state.

Figure 15:
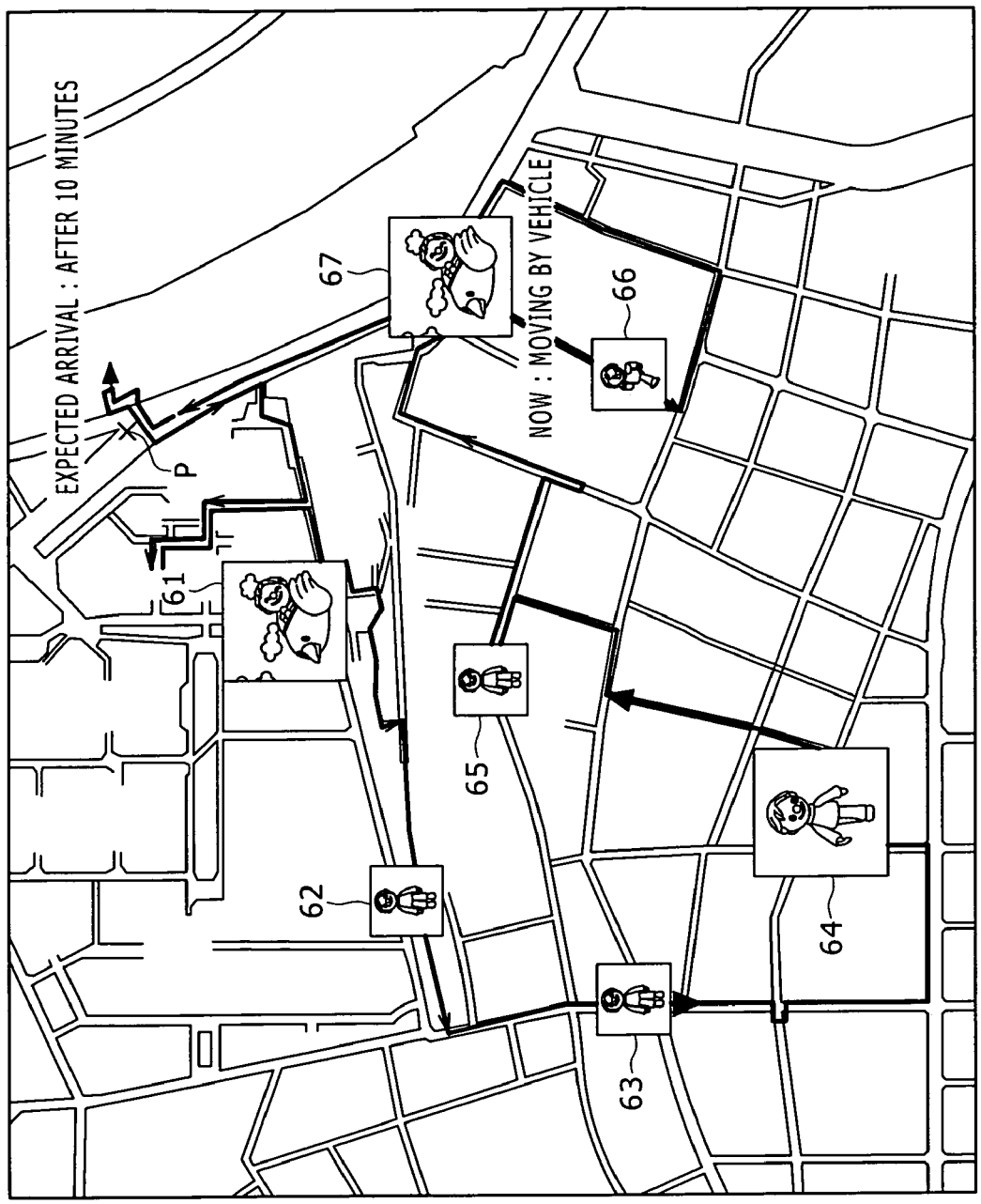
FIG. 15 is a diagram showing an example of a screen displaying a result of prediction.

FIG. 15 is a diagram showing an example of a screen displayed on the portable telephone 2 on the basis of a result of prediction. FIG. 15 shows an example in a case of predicting a time to be taken before the user of the portable telephone 1 arrives at a destination.

In the example of FIG. 15, a map of a predetermined area is displayed, and a destination P is set. The destination P is selected on the map by the user of the portable telephone 2, for example.

In addition, in the example of FIG. 15, characters are displayed which express actions performed by the user of the portable telephone 1 at respective places on the map. Positions where the characters are displayed on the map are obtained on the basis of GPS sensor data included in presence state information and transmitted from the portable telephone 1. The characters are selected on the basis of the state of the user of the portable telephone 1 which state is indicated by the presence state information, as described above.

The character 61 displayed on the screen of FIG. 15 indicates that the user of the portable telephone 1 was riding a vehicle when the user of the portable telephone 1 was at a place where the character 61 is displayed. The character 62 indicates that the user of the portable telephone 1 was standing still when the user of the portable telephone 1 was at a place where the character 62 is displayed. The characters 63, 64, and 65 indicate that the user of the portable telephone 1 was walking when the user of the portable telephone 1 was at places where the respective characters are displayed. The character 66 indicates that the user of the portable telephone 1 was running when the user of the portable telephone 1 was at a place where the character 66 is displayed.

The character 67 indicates the present position of the user of the portable telephone 1 and the action of the user of the portable telephone 1. A message "now: moving by vehicle" indicating the present action of the user of the portable telephone 1 is displayed below the character 67.

Further, in the example of FIG. 15, a message "expected arrival: after 10 minutes" indicating the time to be taken before the user of the portable telephone 1 arrives at the destination P which time is predicted in the portable telephone 2 is displayed at the destination P set on the map. The predicted time is obtained from a distance from the present position of the user of the portable telephone 1 to the destination P and a velocity at which the user of the portable telephone 1 is heading toward the destination P (for example a velocity or an estimated speed of the vehicle obtained from an amount of positional change indicated by GPS sensor data included in the presence state information and sequentially transmitted from the portable telephone 1).

For example, when the user of the portable telephone 1 does not appear at a meeting time even though an appointment to meet the user of the portable telephone 1 at the destination has been made, the user of the portable telephone 2 can confirm that the user of the portable telephone 1 is heading toward the destination and confirm a time to be taken before arrival of the user of the portable telephone 1 or the like by checking such a screen using the portable telephone 2. That is, the user of the portable telephone 2 does not demand to inquire of the user of the portable telephone 1 about the present state of the user of the portable telephone 1 by making a call from the portable telephone 2, for example.

Figure 16:
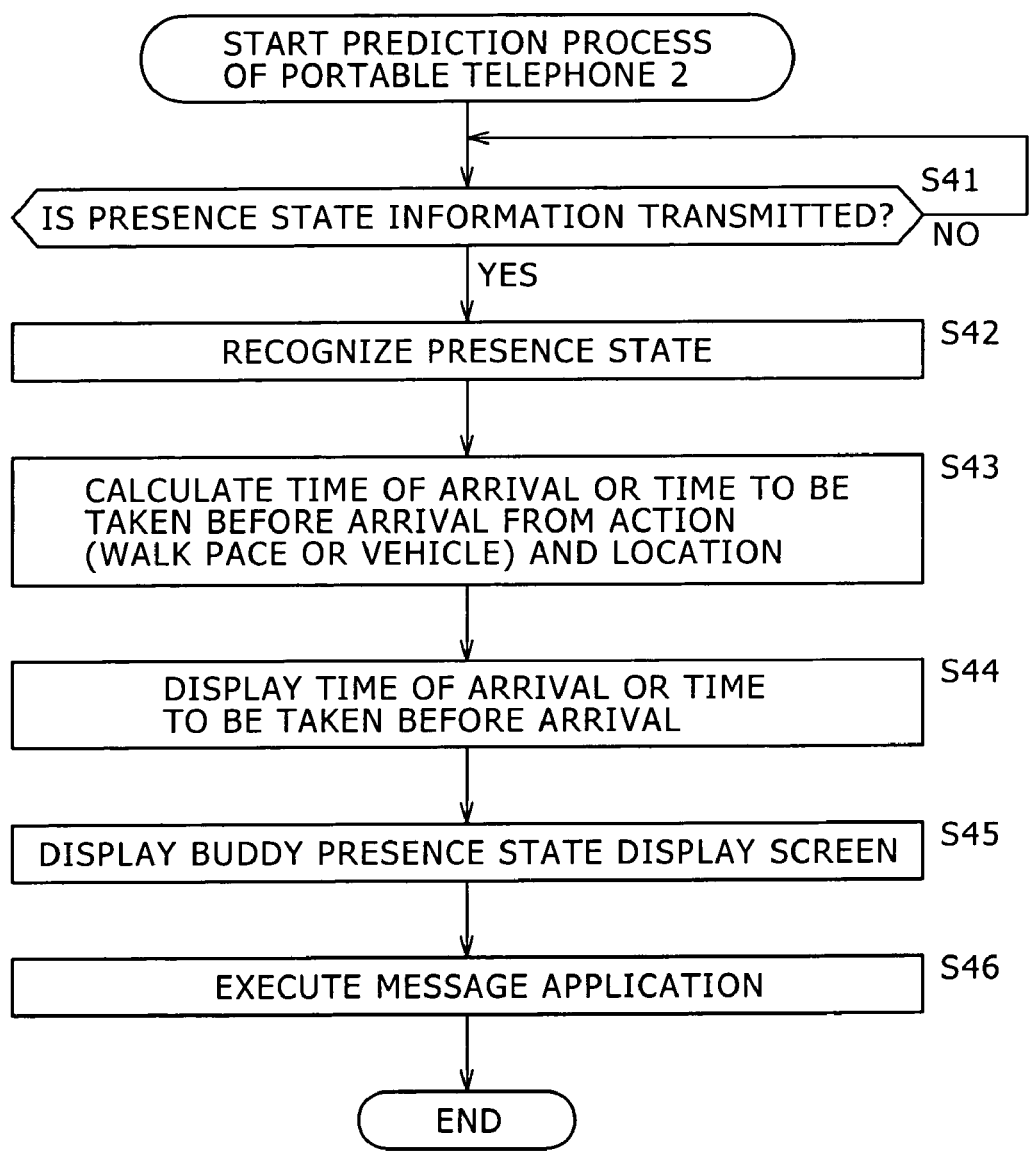
FIG. 16 is a flowchart of assistance in explaining a prediction process of the portable telephone 2.

A process of the portable telephone 2 for displaying the screen as shown in FIG. 15 will be described in the following with reference to a flowchart of FIG. 16. Incidentally, the portable telephone 1 performs the same process as the process of FIG. 12 to repeatedly transmit presence state information including GPS sensor data to the portable telephone 2.

In step S41, the presence state information obtaining unit 41 of the portable telephone 2 determines whether the presence state information is transmitted, and stands by until the presence state information obtaining unit 41 determines that the presence state information is transmitted.

When the presence state information obtaining unit 41 determines in step S41 that the presence state information is transmitted, the process proceeds to step S42. The presence state information transmitted from the portable telephone 1 is output from the presence state information obtaining unit 41 to the Buddy presence state recognition processing unit 42.

In step S42, the Buddy presence state recognition processing unit 42 recognizes a Buddy presence state (the state of the user of the portable telephone 1) on the basis of the presence state information supplied from the presence state information obtaining unit 41. The Buddy presence state recognition processing unit 42 outputs information indicating the recognized Buddy presence state together with the GPS sensor data included in the presence state information and transmitted from the portable telephone 1 to an action prediction processing unit 45.

In step S43, the action prediction processing unit 45 predicts, by calculation, for example a time of arrival of the user of the portable telephone 1 at the destination set by the user of the portable telephone 2 or a time to be taken before the user of the portable telephone 1 arrives at the destination. Such predication is made from the action of the user of the portable telephone 1 which action is recognized by the Buddy presence state recognition processing unit 42 and the present position of the user of the portable telephone 1 which position is obtained from the GPS sensor data. The prediction of the time of arrival uses a present time in addition to the distance from the present position of the user of the portable telephone 1 to the destination P and the velocity at which the user of the portable telephone 1 is heading toward the destination P as described above.

In step S44, the action prediction processing unit 45 displays the time of arrival of the user of the portable telephone 1 at the destination or the time to be taken before the user of the portable telephone 1 arrives at the destination which time is obtained in step S43 on the display unit 15. The action prediction processing unit 45 thereby presents the time of arrival of the user of the portable telephone 1 at the destination or the time to be taken before the user of the portable telephone 1 arrives at the destination to the user of the portable telephone 2. This presentation is performed by screen display as shown in FIG. 15, for example.

In step S45, the Buddy presence state recognition processing unit 42 displays, on the display unit 15, a Buddy presence state display screen on which screen an animation expressing the state of the user of the portable telephone 1 which state is recognized in step S42 is displayed.

When for example the user of the portable telephone 2 gives an instruction to start exchanging messages or the like with the user of the portable telephone 1 in a state of the presence state information display screen being displayed, the communication means selection processing unit 43 executes an application managing a specified communication tool to enable communication with the user of the portable telephone 1. Incidentally, when the automatic selection mode for automatically selecting the communication tool is set in the portable telephone 2, a state in which communication with the user of the portable telephone 1 is enabled may be set automatically by the process described with reference to FIG. 14.

Description will next be made of a process of the portable telephone 2 of displaying an animation representing the state of the user of the portable telephone 1 by the side of an image (moving image) taken by the portable telephone 1 and transmitted together with presence state information.

In this example, the sensor unit 11 of the portable telephone 2 is also provided with a camera, and an image taken by the camera is displayed by the side of an animation representing the action of the user himself/herself of the portable telephone 2 which action is recognized by the portable telephone 2. That is, from the displayed screen, while checking My presence state as the presence state of the user himself/herself of the portable telephone 2 and the Buddy presence state of the user of the portable telephone 1 and the like, the user of the portable telephone 2 can check the images taken by the devices.

Figure 17:
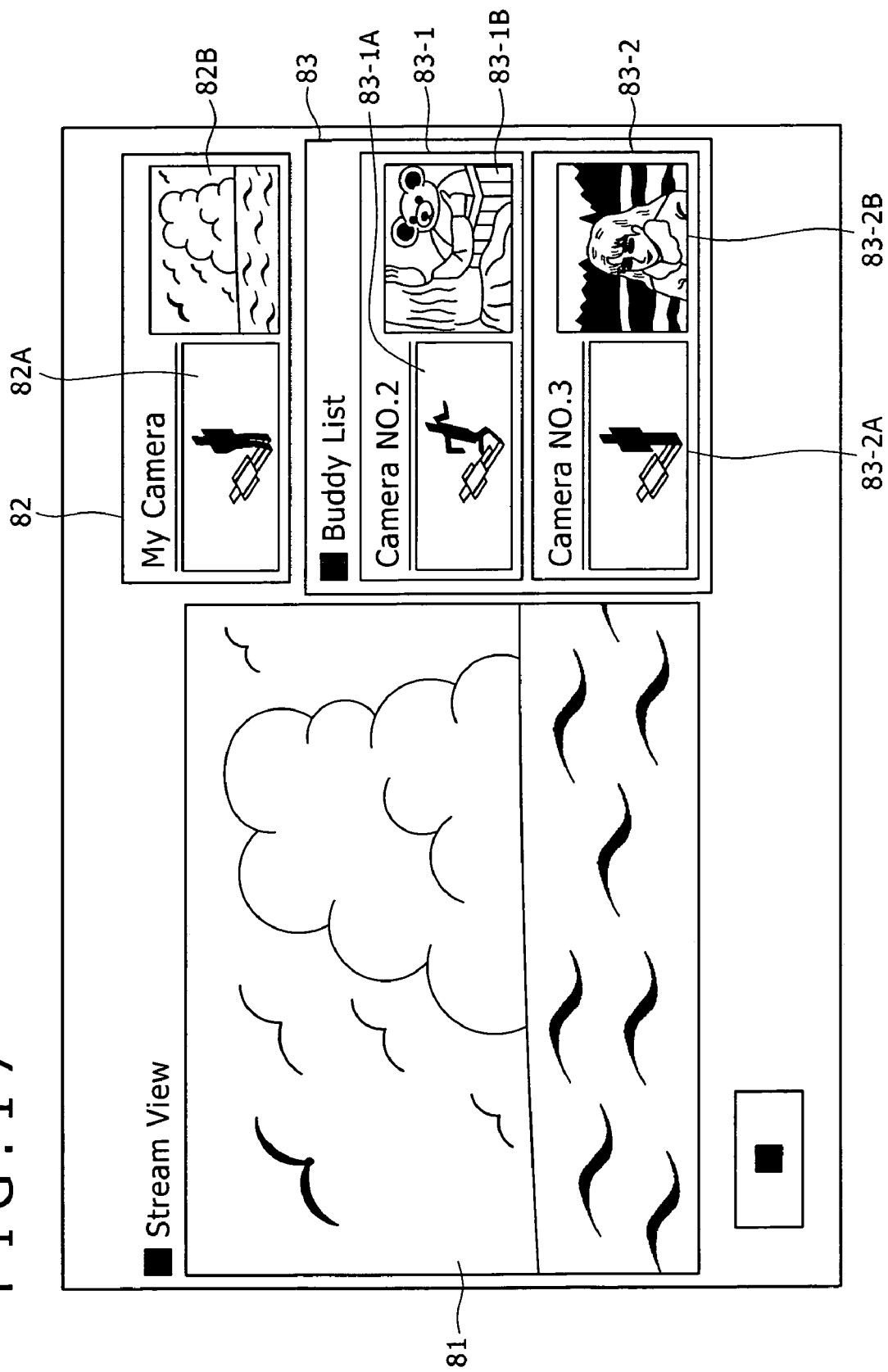
FIG. 17 is a diagram showing an example of a presence state display screen.

FIG. 17 is a diagram showing an example of a presence state display screen displayed on the portable telephone 2.

The presence state display screen of FIG. 17 shows a stream view 81 for displaying an image selected by the user from among an image taken by the camera of the portable telephone 2 and images taken by cameras of other devices including the portable telephone 1, the image taken by the camera of the portable telephone 2 and the images taken by the cameras of the other devices being displayed on a right side of the presence state display screen.

The presence state display screen also shows a My presence state displaying part 82 for displaying information (action and the taken image) on the user of the portable telephone 2 and a Buddy list 83, which is a list of information on other devices.

Of the My presence state displaying part 82 and the Buddy list 83, the My presence state displaying part 82 includes an animation displaying part 82A for displaying an animation representing the action of the user of the portable telephone 2 which action is recognized by the portable telephone 2 and an image displaying part 82B for displaying the image taken by the camera of the portable telephone 2. The animation displayed in the animation displaying part 82A is displayed according to a result of recognition of the action of the user of the portable telephone 2 which recognition is performed in predetermined cycles.

The Buddy list 83 in the example of FIG. 17 shows a Buddy presence state displaying part 83-1 for displaying information on the user of the portable telephone 1 and a Buddy presence state displaying part 83-2 for displaying information on a user of another device than the portable telephone 1. That is, in the example of FIG. 17, the portable telephone 2 communicates with another device than the portable telephone 1 in addition to the portable telephone 1, and a screen is displayed on the basis of presence state information transmitted from these devices.

The Buddy presence state displaying part 83-1 includes an animation displaying part 83-1A for displaying an animation representing the action of the user of the portable telephone 1 which action is recognized by the portable telephone 1 and an image displaying part 83-1B for displaying the image taken by the camera of the portable telephone 1. The Buddy presence state displaying part 83-2 includes an animation displaying part 83-2A for displaying an animation representing the action of the user of the other device which action is recognized by the other device and an image displaying part 83-2B for displaying the image taken by the camera of the other device. The animations displayed in the animation displaying parts 83-1A and 83-2A are also displayed according to results of recognition of the actions of the users of the respective devices which results are indicated by presence state information transmitted from the respective devices.

By for example selecting the image displayed in the image displaying part 83-1B in the Buddy presence state displaying part 83-1, the user of the portable telephone 2 can make the same image as the image displayed in the image displaying part 83-1B displayed in an enlarged state in the stream view 81. In the example of FIG. 17, the same image as the image taken by the portable telephone 2 and displayed in the image displaying part 82B is displayed in an enlarged state in the stream view 81.

On a screen where an image taken at a remote place and transmitted via a network can be viewed, a user viewing the screen is generally unable to check what action the photographer is performing, for example. However, when an animation representing the action of the photographer on the basis of presence state information transmitted from a device taking the image and the taken image are thus displayed next to each other (in the vicinity of each other), the user viewing the screen can check the taken image in addition to the action of the photographer.

Figure 18:
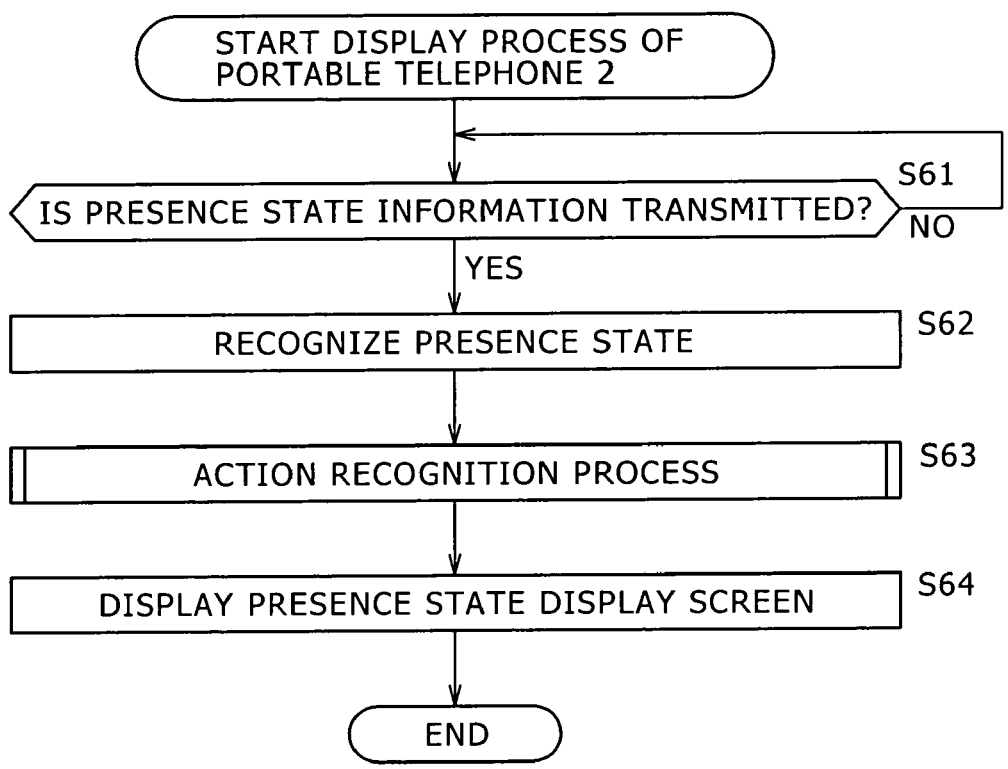
FIG. 18 is a flowchart of assistance in explaining a displaying process of the portable telephone 2.

A process of the portable telephone 2 of displaying a screen as shown in FIG. 17 will be described in the following with reference to a flowchart of FIG. 18. Incidentally, the portable telephone 1 performs the same process as the process of FIG. 12 to repeatedly transmit presence state information together with a taken image to the portable telephone 2.

In step S61, the presence state information obtaining unit 41 of the portable telephone 2 determines whether the presence state information is transmitted, and stands by until the presence state information obtaining unit 41 determines that the presence state information is transmitted.

When the presence state information obtaining unit 41 determines in step S61 that the presence state information is transmitted, the process proceeds to step S62. For example the presence state information transmitted from the portable telephone 1 is output from the presence state information obtaining unit 41 to the Buddy presence state recognition processing unit 42. In addition, images taken by other devices including the portable telephone 1 and transmitted together with presence state information are also supplied to the Buddy presence state recognition processing unit 42.

In step S62, the Buddy presence state recognition processing unit 42 recognizes a Buddy presence state (the state of the user of the portable telephone 1) on the basis of the presence state information supplied from the presence state information obtaining unit 41.

In step S63, when measurement is performed by the various sensors forming the sensor unit 11 and sensor data is supplied as a result of measurement, the action recognizing unit 12 of the portable telephone 2 performs an action recognition process. That is, the same process as the process described with reference to FIG. 13 is performed in the portable telephone 2, and a result of recognition (My presence state) is output to the My presence state recognition processing unit 34.

In step S64, the My presence state recognition processing unit 34 displays an animation indicating the My presence state at a predetermined position of the display unit 15 and displays an image taken by the portable telephone 2 itself. The Buddy presence state recognition processing unit 42 similarly displays an animation indicating the Buddy presence state at a predetermined position of the display unit 15 and displays the image taken by the other device. Thereby a presence state display screen as shown in FIG. 17 is displayed.

By exchanging messages with the user of the portable telephone 1 in a state of the presence state display screen being displayed, the user of the portable telephone 2 can for example communicate with the user of the portable telephone 1 through the messages about a subject taken by the user of the portable telephone 1 while viewing the action of the user of the portable telephone 1.

While the above description assumes that a device transmitting presence state information performs a process of recognizing the action of a user and that a result of the recognition is transmitted to a receiving device in a state of being included in presence state information, sensor data may be transmitted as it is to the receiving device, and the receiving device may perform the process of recognizing the action (the action of the user of the transmitting device) on the basis of the sensor data.

The series of processes described above can be carried out by software as well as by hardware. In this case, a device that executes the software is formed by a personal computer as shown in FIG. 19, for example.

A CPU (Central Processing Unit) 101 in FIG. 19 performs various processes according to a program stored in a ROM (Read Only Memory) 102 or a program loaded from a storage unit 108 into a RAM (Random Access Memory) 103. The RAM 103 also stores data and the like necessary for the CPU 101 to perform the various processes as needed.

The CPU 101, the ROM 102, and the RAM 103 are interconnected via a bus 104. The bus 104 is also connected with an input-output interface 105.

The input-output interface 105 is connected with an input unit 106 formed by a keyboard, a mouse and the like, an output unit 107 formed by a display such as an LCD (Liquid Crystal Display), a speaker and the like, the storage unit 108 formed by a hard disk or the like, and a communication unit 109 for performing communication processing via a network.

The input-output interface 105 is also connected with a drive 110 as needed. A removable medium 111 formed by a magnetic disk, an optical disk, a magneto-optical disk, a semiconductor memory or the like is loaded into the drive 110 as needed. A computer program read from the removable medium 111 is installed in the storage unit 108 as needed.

When the series of processes is to be carried out by software, a program constituting the software is installed from a network or a recording medium onto a computer incorporated in special hardware, or a general-purpose personal computer, for example, that can perform various functions by installing various programs thereon.

As shown in FIG. 19, the recording medium is formed by the removable medium 111 distributed to users to provide the program separately from the apparatus proper and having the program recorded thereon, the removable medium 111 being formed by a magnetic disk (including flexible disks), an optical disk (including CD-ROM (Compact Disk-Read Only Memory) and DVD (Digital Versatile Disk)), a magneto-optical disk (including MD (registered trademark) (Mini-Disk)), a semiconductor memory or the like. The recording medium is also formed by the ROM 102, the hard disk included in the recording unit 108, or the like that has the program recorded thereon and which is provided to the user in a state of being preincorporated in the apparatus proper.

It is to be noted that in the present specification, the steps describing the program recorded on the recording medium include processes carried out in time series in the described order in addition to processes carried out in parallel or individually and not necessarily in time series.

In addition, in the present specification, a system refers to an apparatus as a whole formed by a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device connected via a network to an other information processing device, said information processing device comprising:

receiving means for receiving action information indicating at least one recognized action of a user of said other information processing device based on an output of a sensor incorporated in said other information processing device;

managing means for managing correspondence relation between the at least one recognized action in said other information processing device and at least one communication tool corresponding to the at least one recognized action, the at least one communication tool including a text-based communication tool and a voice-based communication tool;

selecting means for selecting the at least one communication tool corresponding to the at least one recognized action which is only allowed as a tool to be used for communication with the user of said other information processing device on a basis of said correspondence relation managed by said managing means; and executing means for executing an application that manages the selected communication tool, wherein the text-based communication tool communicates through modes of communication including electronic mail and instant messaging, and the voice-based communication tool communicates through modes of communication including telephony and voicemail.

2. The information processing device as claimed in claim 1, wherein when said correspondence relation represents correspondences between the at least one recognized action in each time period and the at least one communication tool, said selecting means selects the at least one communication tool on a basis of a present time in addition to the at least one recognized action of the user of said other information processing device.

3. The information processing device as claimed in claim 1, wherein
said managing means manages the correspondence relation between the at least one recognized action in said other information processing device and the at least one communication tool in a form of a table.

4. An information processing method of an information processing device connected via a network to another information processing device, said information processing method comprising:
receiving action information indicating at least one recognized action of a user of said other information processing device based on an output of a sensor incorporated in said other information processing device;
managing correspondence relation between the at least one recognized action in said other information processing device and at least one communication tool corresponding to the at least one recognized action, the at least one communication tool including a text-based communication tool and a voice-based communication tool;
selecting the at least one communication tool corresponding to the at least one recognized action which is only allowed as a tool to be used for communication with the user of said other information processing device on a basis of correspondence relation managed in the managing correspondence relation; and
executing an application that manages the selected communication tool, wherein
communicating through the text-based communication tool includes communicating through modes of communication including electronic mail and instant messaging, and
communicating through the voice-based communication tool includes communicating through modes of communication including telephony and voicemail.

5. A computer-readable storage medium having embedded therein instructions, which when executed by a processor, cause the processor to perform information processing in an information processing device connected via a network to another information processing device, said method comprising:
receiving action information indicating at least one recognized action of a user of said other information processing device based on an output of a sensor incorporated in said other information processing device;
managing correspondence relation between the at least one recognized action in said other information processing device and at least one communication tool corresponding to the at least one recognized action, the at least one communication tool including a text-based communication tool and a voice-based communication tool;
selecting the at least one communication tool corresponding to the at least one recognized action which is only allowed as a tool to be used for communication with the user of said other information processing device on a basis of correspondence relation managed in the managing correspondence relation; and
executing an application that manages the selected communication tool, wherein
communicating through the text-based communication tool includes communicating through modes of communication including electronic mail and instant messaging, and
communicating through the voice-based communication tool includes communicating through modes of communication including telephony and voicemail.

6. An information processing device connected via a network to an other information processing device, said information processing device comprising:
a receiver configured to receiver action information indicating at least one recognized action of a user of said other information processing device based on an output of a sensor incorporated in said other information processing device;
a managing unit configured to manage correspondence relation between the at least one recognized action in said other information processing device and at least one communication tool corresponding to the at least one recognized action, the at least one communication tool including a text-based communication tool and a voice-based communication tool;
a communication means selection processing unit configured to select the at least one communication tool corresponding to the at least one recognized action which is only allowed as a tool to be used for communication with the user of said other information processing device on a basis of said correspondence relation managed by said managing unit; and
an executing unit configured to execute an application that manages the selected communication tool, wherein
the text-based communication tool communicates through modes of communication including electronic mail and instant messaging, and
the voice-based communication tool communicates through modes of communication including telephony and voicemail.

* * * * *